United States Patent
Fong

(10) Patent No.: US 9,417,787 B2
(45) Date of Patent: Aug. 16, 2016

(54) DISTORTION EFFECTS TO INDICATE LOCATION IN A MOVABLE DATA COLLECTION

(75) Inventor: Jeffrey Cheng-Yao Fong, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1216 days.

(21) Appl. No.: 12/721,419

(22) Filed: Mar. 10, 2010

(65) Prior Publication Data

US 2011/0202859 A1 Aug. 18, 2011

Related U.S. Application Data

(60) Provisional application No. 61/304,004, filed on Feb. 12, 2010.

(51) Int. Cl.
*G06F 3/0481* (2013.01)
*G06F 3/0488* (2013.01)

(52) U.S. Cl.
CPC ........ *G06F 3/04883* (2013.01); *G06F 3/04886* (2013.01); *G06F 2203/04104* (2013.01); *G06F 2203/04808* (2013.01)

(58) Field of Classification Search
CPC ... G06F 3/0486; G06F 3/0481; G06F 9/4443; G06F 3/0485; G06F 3/04855
USPC ........................... 715/769, 815, 817–820, 830
See application file for complete search history.

(56) References Cited

U.S. PATENT DOCUMENTS

| | | | |
|---|---|---|---|
| 5,581,670 | A | 12/1996 | Bier et al. |
| 5,860,073 | A | 1/1999 | Ferrel et al. |
| 5,874,961 | A | 2/1999 | Bates et al. |
| 6,028,593 | A | 2/2000 | Rosenberg |
| 6,157,381 | A | 12/2000 | Bates et al. |
| 6,246,406 | B1 | 6/2001 | Nielsen et al. |
| 6,366,302 | B1 | 4/2002 | Crosby |
| 6,469,718 | B1 | 10/2002 | Setogawa et al. |

(Continued)

FOREIGN PATENT DOCUMENTS

| | | |
|---|---|---|
| JP | 2001-351125 | 12/2001 |
| JP | 2002-99484 | 4/2002 |

(Continued)

OTHER PUBLICATIONS

Cerney and Vance, "Gesture Recognition in Virtual Environments: A Review and Framework for Future Development," Iowa State University Human Computer Interaction Technical Report ISU-HCI-2005-01, Mar. 28, 2005, 25 pages.

(Continued)

*Primary Examiner* — Anil Bhargava
(74) *Attorney, Agent, or Firm* — Judy Yee; Micky Minhas

(57) ABSTRACT

Techniques and tools are described that relate to different aspects of a user interface in which visual distortion effects are presented to provide visual cues to a user to indicate a location in a movable data collection (e.g., a scrollable list, an email message, a content layer, etc.). For example, in response to a user gesture on a touchscreen, a user interface system presents a portion of a list or layer in a visually distorted state, such as a "squished," squeezed or compressed state in which text, images or other content is shown to be smaller than normal in one or more dimensions, to indicate to a user that the end of a list has been reached.

20 Claims, 16 Drawing Sheets

(56) References Cited

U.S. PATENT DOCUMENTS

| | | |
|---|---|---|
| 6,714,213 B1 | 3/2004 | Lithicum |
| 6,985,149 B2 | 1/2006 | Peercy et al. |
| 7,032,181 B1 | 4/2006 | Farcasiu |
| 7,203,901 B2 | 4/2007 | Chen |
| 7,337,392 B2 | 2/2008 | Lue |
| 7,428,709 B2 | 9/2008 | Forstall et al. |
| 7,430,712 B2 | 9/2008 | Arokiaswamy |
| 7,461,353 B2 | 12/2008 | Rohrabaugh |
| 7,469,381 B2 | 12/2008 | Ording |
| 7,634,789 B2 | 12/2009 | Gerba |
| 7,636,755 B2 | 12/2009 | Blattner et al. |
| 7,663,620 B2 | 2/2010 | Robertson et al. |
| 7,690,997 B2 | 4/2010 | Van Luchene et al. |
| 7,698,654 B2 | 4/2010 | Fong et al. |
| 7,698,658 B2 | 4/2010 | Ohwa et al. |
| 7,707,494 B2 | 4/2010 | Ohta |
| 7,724,242 B2 | 5/2010 | Hillis et al. |
| 7,735,004 B2 | 6/2010 | Kobashi et al. |
| 7,779,360 B1 | 8/2010 | Jones et al. |
| 7,958,456 B2 | 6/2011 | Ording |
| 8,113,951 B2 | 2/2012 | David et al. |
| 8,127,246 B2 | 2/2012 | Furches et al. |
| 8,223,134 B1* | 7/2012 | Forstall ................ G06F 3/0482 345/173 |
| 2002/0135602 A1 | 9/2002 | Davis et al. |
| 2003/0095135 A1 | 5/2003 | Kaasila |
| 2005/0149551 A1 | 7/2005 | Fong et al. |
| 2006/0053048 A1 | 3/2006 | Tandetnik |
| 2006/0095360 A1 | 5/2006 | Apple et al. |
| 2006/0143577 A1* | 6/2006 | Hsieh et al. ................ 715/815 |
| 2006/0161863 A1 | 7/2006 | Gallo |
| 2006/0174214 A1 | 8/2006 | McKee et al. |
| 2006/0210958 A1 | 9/2006 | Rimas-Ribikauskas |
| 2006/0277469 A1 | 12/2006 | Chaudhri et al. |
| 2007/0079246 A1 | 4/2007 | Morillon et al. |
| 2007/0132789 A1 | 6/2007 | Ording |
| 2007/0150830 A1 | 6/2007 | Ording et al. |
| 2007/0188444 A1 | 8/2007 | Vale et al. |
| 2007/0245260 A1 | 10/2007 | Koppert |
| 2007/0294635 A1 | 12/2007 | Craddock et al. |
| 2008/0016471 A1 | 1/2008 | Park |
| 2008/0165210 A1 | 7/2008 | Platzer |
| 2008/0168349 A1 | 7/2008 | Lamiraux et al. |
| 2008/0178126 A1 | 7/2008 | Beeck |
| 2008/0215995 A1 | 9/2008 | Wolf |
| 2008/0307361 A1 | 12/2008 | Louch |
| 2009/0007017 A1 | 1/2009 | Anzures et al. |
| 2009/0070711 A1* | 3/2009 | Kwak et al. ................ 715/829 |
| 2009/0073194 A1 | 3/2009 | Ording |
| 2009/0125824 A1 | 5/2009 | Andrews et al. |
| 2009/0125836 A1 | 5/2009 | Yamamoto et al. |
| 2009/0138815 A1 | 5/2009 | Mercer |
| 2009/0204928 A1 | 8/2009 | Kallio et al. |
| 2009/0231271 A1 | 9/2009 | Heubel |
| 2009/0284478 A1 | 11/2009 | De la Torre Baltierra et al. |
| 2009/0292989 A1 | 11/2009 | Matthews et al. |
| 2009/0293007 A1 | 11/2009 | Duarte et al. |
| 2009/0315839 A1 | 12/2009 | Wilson et al. |
| 2009/0327938 A1 | 12/2009 | Faraday et al. |
| 2010/0009747 A1 | 1/2010 | Reville et al. |
| 2010/0011316 A1 | 1/2010 | Sar |
| 2010/0026698 A1 | 2/2010 | Reville et al. |
| 2010/0039447 A1 | 2/2010 | Nakao |
| 2010/0073380 A1 | 3/2010 | Kaplan et al. |
| 2010/0083165 A1 | 4/2010 | Andrews et al. |
| 2010/0107068 A1 | 4/2010 | Butcher et al. |
| 2010/0134425 A1 | 6/2010 | Storrusten |
| 2010/0137031 A1 | 6/2010 | Griffin et al. |
| 2010/0175027 A1 | 7/2010 | Young et al. |
| 2010/0269038 A1* | 10/2010 | Tsuda ................ G06F 3/04886 715/702 |
| 2011/0001709 A1* | 1/2011 | Wang ................ G06F 3/0485 345/173 |
| 2011/0022985 A1 | 1/2011 | Ording et al. |
| 2011/0055752 A1 | 3/2011 | Rubinstein et al. |
| 2011/0078597 A1 | 3/2011 | Rapp et al. |
| 2011/0080351 A1* | 4/2011 | Wikkerink .......... G06F 3/04883 345/173 |
| 2011/0090255 A1* | 4/2011 | Wilson ................ G06F 3/04817 345/647 |
| 2011/0093778 A1 | 4/2011 | Kim et al. |
| 2011/0093812 A1 | 4/2011 | Fong |
| 2011/0107264 A1* | 5/2011 | Akella .................. G06F 3/0482 715/830 |
| 2011/0161892 A1* | 6/2011 | Hamadene .......... G06F 3/04845 715/863 |
| 2011/0181527 A1 | 7/2011 | Capela et al. |
| 2011/0199318 A1 | 8/2011 | Fong et al. |
| 2011/0202834 A1 | 8/2011 | Mandryk et al. |
| 2011/0231782 A1 | 9/2011 | Rohrabaugh et al. |
| 2012/0144322 A1 | 6/2012 | Park |

FOREIGN PATENT DOCUMENTS

| | | |
|---|---|---|
| JP | 2002-244641 | 8/2002 |
| JP | 2007-183914 | 7/2007 |
| JP | 2008-52621 | 3/2008 |
| JP | 2009-205675 | 9/2009 |
| KR | 10-0400208 | 12/2003 |
| WO | WO 2007/017784 | 2/2007 |
| WO | WO 2008/085877 | 7/2008 |
| WO | WO 2009/044770 | 4/2009 |

OTHER PUBLICATIONS

Fasig, "Windows 7: Inside Multitouch," PCMag.com, dated Oct. 26, 2009, visited Apr. 15, 2010, 4 pages.

"iPhone How To: Lists," www.apple.com, visited Apr. 15, 2010, 1 page.

"iPhone How To: Scrolling," www.apple.com, visited Apr. 15, 2010, 1 page.

"iPhone How To: Viewing in Landscape," www.apple.com, visited Apr. 15, 2010, 1 page.

"iPhone How To: Zooming In or Out," www.apple.com, visited Apr. 15, 2010, 1 page.

"iPod touch Technology," www.apple.com, visited Apr. 15, 2010, 3 pages.

Kratz and Ballaga, "Gesture Recognition Using Motion Estimation on Mobile Phones," 3rd Int'l Workshop on Pervasive Mobile Interaction Devices (PERMID 20070, May 13, 2007, 5 pages.

Moussa, "Combining Expert Neural Networks Using Reinforcement Feedback for Learning Primitive Grasping Behavior," *IEEE Transactions on Neural Networks*, vol. 15, No. 3, May 3, 2004, pp. 629-638, 10 pages.

Niezen and Hancke, "Gesture Recognition as Ubiquitous Input for Mobile Phones," UbiComp '08 Workshop WI—Devices that Alter Perception (DAP 2008), Sep. 21, 2008, 5 pages.

Young, "All About Touch in Windows Media Center in Windows 7," Windows Media Center Team Blog, dated Sep. 15, 2009, visited Apr. 15, 2010, 6 pages.

"Zune HD is Real, Has Multitouch Web Browsing, OLED Screen and HD Video," gizmodo.com, dated May 26, 2009, visited Apr. 15, 2010, 3 pages.

Kathy Sierra, "iPhone and the Dog Ears User Experience Model," http://headrush.typepad.com/creating_passionate_users/2007/01/iphone_and_the_.html, 10 pp. (Jan. 2007).

Nathan Weinberg, "Exclusive: Windows Mobile 7 to Focus on Touch and Motion Gestures," http://www.etenblog.com/2008/01/09/windows-mobile-7-to-focus-on-touch-and-motion-gestures/, 38 pp. (Jan. 2008).

"Windows Phone 7 Series Features Video," http://www.youtube.com/watch?v=7IOTrqlz4jo, 2 pp. (Feb. 12, 2010).

"Windows Phone 7 Series Demo," http://www.youtube.com/watch?v=MdDAeyy1H0A, 2 pp. (Feb. 12, 2010).

Baudisch et al., "Fishnet, a fisheye web browser with search term popouts: a comparative evaluation with overview and linear view," AVI 2004: Advanced Visual Interfaces Int'l Working Conference, Gallipolli, Italy, May 2004, pp. 133-140.

Kiriati et al., "Introducing Windows® 7 for Developers," 417 pages, Microsoft Press (2010).

(56) References Cited

OTHER PUBLICATIONS

McCracken, "Windows 7 Review," <http://www.pcworld.com/printable/article/id,172602/printable.html>, 6 pages (Oct. 19, 2009).
Coyier, "Scroll/Follow Sidebar, Multiple Techniques," 4 pp. (Nov. 30, 2009).
Jeff Dion, "Creating a Floating HTML Menu Using jQuery and CSS," <http://net.tutsplus.com/html-css-techniques/creating-a-floating-html-menu-using-jquery-and-css/>, 8 pp. (Jun. 2008).
Supplementary European Search Report dated Sep. 19, 2013, from European Patent Application No. EP 11742918, 3 pp.
Examination Report from European Patent Application No. 11 742 918.3, dated Oct. 17, 2013, 7 pp.
Notice on the Third Office Action from Chinese Patent Application No. 201180009131.0, dated May 6, 2014, 6 pages (English translation).
Notice on the Third Office Action from Chinese Patent Application No. 201180009220.5, dated Aug. 6, 2014, 6 pages.
First Examination Report from Australian Patent Application No. 2011215654, dated Feb. 26, 2014, 4 pages.
Office action from U.S. Appl. No. 13/089,252, dated Oct. 23, 2013, 22 pages.
Notice of Allowance from U.S. Appl. No. 13/089,252, dated Jun. 9, 2014, 18 pages.
Examination Report from European Patent Application No. 11 742 904.3, dated Oct. 17, 2013, 7 pp.
Final office action from U.S. Appl. No. 12/824,049, dated Feb. 18, 2011, 24 pages.
Final Office Action from U.S. Appl. No. 12/824,060, dated Feb. 18, 2011, 28 pages.
Final Office action from U.S. Appl. No. 12/824,049, Dec. 9, 2011, 26 pages.
Final Office action from U.S. Appl. No. 12/824,060, dated Dec. 9, 2011, 34 pages.
Final Office action from U.S. Appl. No. 12/824,049, dated Aug. 16, 2012, 17 pages.
Final Office action from U.S. Appl. No. 12/824,060, dated Aug. 17, 2012, 38 pages.
Final Office action from U.S. Appl. No. 12/773,803, dated Sep. 5, 2013, 20 pages.
Notice of Allowance from U.S. Appl. No. 12/824,049, dated Feb. 22, 2013, 32 pages.
Notice on the First Office Action from Chinese Patent Application No. 201180009220.5 dated Apr. 28, 2013, 11 pp. (English translation).
Notice on the First Office Action from Chinese Patent Application No. 201180009131.0, dated May 6, 2013, 11 pages (English translation).
Notice on the Second Office Action from Chinese Patent Application No. 201180009131.0, dated Nov. 21, 2013, 6 pages (English translation).
Notice on the Second Office Action from Chinese Patent Application No. 201180009220.5, dated Dec. 3, 2013, 14 pages (English translation).
Office action from U.S. Appl. No. 12/824,049, dated Oct. 28, 2010, 23 pages.
Office Action from U.S. Appl. No. 12/824,060, dated Oct. 28, 2010, 26 pages.
Office action from U.S. Appl. No. 12/824,049, dated Aug. 18, 2011, 24 pages.
Office Action from U.S. Appl. No. 12/824,060, dated Aug. 19, 2011, 28 pages.
Office Action from U.S. Appl. No. 12/824,049, dated May 15, 2012, 30 pages.
Office Action from U.S. Appl. No. 12/824,060, dated May 23, 2012, 38 pages.
Office action from U.S. Appl. No. 12/773,803, dated Feb. 15, 2013, 25 pages.
Supplementary European Search Report dated Oct. 4, 2013, from European Patent Application No. EP 11742904.3, 5 pp.
Notice of Rejection, Japanese Patent Application No. 2012-553056, Dec. 5, 2014, 4 pages.
Notice of Rejection, Japanese Patent Application No. 2012-553049, Dec. 5, 2014, 10 pages.
Notice on the Fourth Office Action, Chinese Patent Application No. 201180009131.0, Oct. 10, 2014, 7 pages.

* cited by examiner

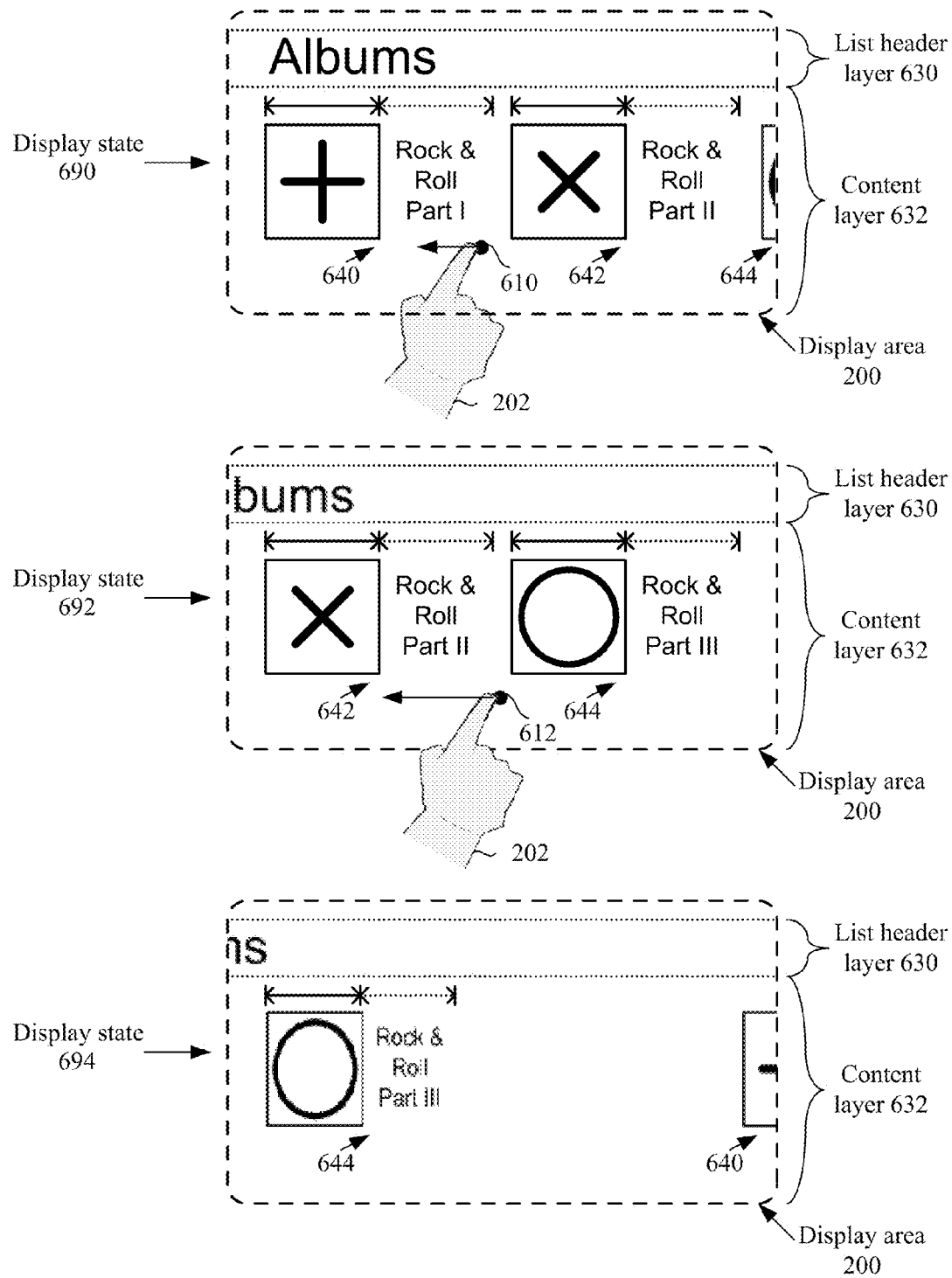

software 980 implementing described techniques
and tools for indicating location with distortion
effects

DISTORTION EFFECTS TO INDICATE LOCATION IN A MOVABLE DATA COLLECTION

CROSS REFERENCE TO RELATED APPLICATION

This application claims the benefit of U.S. Provisional Patent Application No. 61/304,004, filed on Feb. 12, 2010, entitled "MULTI-LAYER USER INTERFACE WITH FLEXIBLE MOVEMENT," which is incorporated herein by reference.

FIELD

Techniques and tools described herein relate to presenting visual information to users on computer displays, and more particularly relate to presenting visual information on small displays, such as those found on smartphones and other mobile computing devices.

BACKGROUND

The design of an effective user interface poses many challenges. One challenge is how to provide a user with an optimal amount of visual information or functionality, given the space limitations of a display and the needs of a particular user. This challenge can be especially acute for devices with small displays, such as smartphones or other mobile computing devices. This is because there is often more information available to a user performing a particular activity (e.g., browsing for audio or video files in a library of files) than can fit on the display. A user can easily become lost unless careful attention is paid to how information is presented on the limited amount of available display space. Visual cues are useful for indicating, for example, a user's location when browsing a list or other collection of data, since it is often not possible to show an entire collection (e.g., a list of contacts stored in a smartphone) on a small display.

Whatever the benefits of previous techniques, they do not have the advantages of the techniques and tools presented below.

SUMMARY

Techniques and tools are described that relate to different aspects of a user interface in which visual distortion effects are presented to provide visual cues to a user to indicate a location in a movable data collection (e.g., a scrollable list, email message, a content layer, etc.). For example, in response to a user gesture on a touchscreen, a user interface system presents a portion of a list in a visually distorted state, such as a "squished," squeezed or compressed state in which text, images or other content in the data collection is shown to be smaller than normal in one or more dimensions, to indicate to a user that the end of a list has been reached.

In one aspect, a computer system (e.g., a mobile computing device) provides a user interface comprising a movable data collection (e.g., a scrollable list) comprising plural elements. The elements of the movable data collection can include various kinds of information, such as text, images, combinations of text and images, and/or other information. The system receives user input indicating a first movement in the movable data collection. In response to the first movement, the system generates a visual distortion effect in at least one of the elements in the movable data collection. The visual distortion effect indicates a location (e.g., the end) in the movable data collection. The system renders the first movement, the at least one element, and the visual distortion effect for display. For example, for a vertically scrollable list, the rendered visual distortion effect comprises a vertical squeeze of a visual representation (e.g., a visual representation of text, an image, etc.) of at least part of the at least one element. As another example, for a horizontally scrollable list, the rendered visual distortion effect comprises a horizontal squeeze of a visual representation of the at least one element. Other effects (such as additional distortion effects, reduction of space between elements, or display of part of a first element in the collection to show that wrapping functionality is available) can provide additional indications of a location in the data collection.

In another aspect, a computer system provides a user interface comprising at least first and second substantially parallel layers to be displayed simultaneously. A first portion of the first layer is in a viewable display area, and a second portion of the first layer is outside of the viewable display area. The system receives user input indicating a first movement in the first layer. The system renders the first movement in the first layer. The rendering of the first movement comprises presenting a distortion effect to indicate a location in the first layer (e.g., an end of the first layer), and scrolling at a first movement rate to bring the second portion of the first layer into the viewable display area. For example, the first movement in the first layer comprises a horizontal movement of the layer, and the distortion effect comprises a horizontal compression of an element in the layer. As another example, the first portion of the first layer comprises a first portion of a vertically scrollable list in the first layer, the second portion of the first layer comprises a second portion of the vertically scrollable list, the first movement in the first layer comprises a vertical movement of the vertically scrollable list, and the distortion effect comprises a vertical compression of an element in the vertically scrollable list. A second movement in the second layer can be a scrolling movement at a second movement rate that differs from the first movement rate. For example, if the first movement in the first layer is a horizontal movement of the layer, the second movement can be a horizontal movement at a movement rate that is based at least in part on the first movement rate.

In another aspect, a user interface system comprises a motion module operable to receive user interface manipulation events and convert the user interface manipulation events to motion commands, and a layout module operable to receive the motion commands and generate rendering requests operable to render a visual distortion effect that indicates a location in a visual representation of a data collection that is movable by a user. The user interface system can be implemented in an operating system on a mobile computing device.

The foregoing and other objects, features, and advantages of the invention will become more apparent from the following detailed description, which proceeds with reference to the accompanying figures.

BRIEF DESCRIPTION OF THE DRAWINGS

FIG. 6 is a diagram showing distortion effects to indicate location in a data collection in a UI having parallel layers that move at different rates, according to one or more described embodiments.

DETAILED DESCRIPTION

Figure 1:
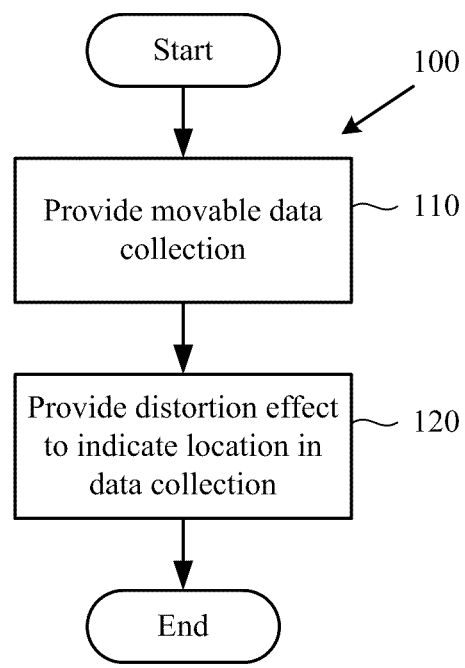
FIG. 1 is a flow chart showing an example technique for providing a user interface with a movable list and one or more end-of-list effects to indicate when the end of a list has been reached, according to one or more described embodiments.

Techniques and tools are described that relate to different aspects of a user interface in which visual distortion effects are presented to provide visual cues to a user to indicate a location in a data collection (e.g., the end of a scrollable list). In described implementations, a user interface system presents a portion of a list in a visually distorted state, such as a "squished," squeezed or compressed state, in which text, images or other content is shown to be smaller than normal in one or more dimensions, to indicate to a user that the end of a list has been reached.

Various alternatives to the implementations described herein are possible. For example, techniques described with reference to flowchart diagrams can be altered by changing the ordering of stages shown in the flowcharts, by repeating or omitting certain stages, etc. As another example, systems described with reference to system diagrams can be altered by changing the ordering of processing stages shown in the diagrams, by repeating or omitting certain stages, etc. As another example, user interfaces described with reference to diagrams can be altered by changing the content or arrangement of user interface features shown in the diagrams, by omitting certain features, etc. As another example, although some implementations are described with reference to specific devices and user input mechanisms (e.g., mobile devices with a touchscreen interface), described techniques and tools can be used with other devices and/or user input mechanisms.

The various techniques and tools can be used in combination or independently. Different embodiments implement one or more of the described techniques and tools.

I. Distortion Effects to Indicate Location in a Data Collection

The design of effective user interfaces poses many challenges. One challenge is how to provide a user with an optimal amount of visual information or functionality, given the space limitations of displays. This challenge can be especially acute for devices with small displays, such as smartphones or other mobile computing devices. This is because there is often more information or functionality available than can fit on the display. A user can easily become lost unless careful attention is paid to how information is presented on the limited amount of available display space.

Visual cues are useful for indicating, for example, a user's location when browsing a list or other collection of data, since it is often not possible to show an entire collection (e.g., a list of contacts on smartphone) on a small display. In one previous solution, graphical scroll bars are used to indicate a position in a list. However, scroll bars occupy part of the display, further reducing the available space for the content that is of interest to users, and adding visual clutter that reduces the quality of the user experience.

Accordingly, techniques and tools are described that relate to different aspects of a user interface in which visual distortion effects are presented to provide visual cues to a user to indicate a location (e.g., an end, beginning, or other location) in a data collection (e.g., a list). In described implementations, a user interface system presents a portion of a list in a visually distorted state, such as a "squished," squeezed or compressed state (i.e., a state in which text, images or other content is shown to be smaller than normal in one or more dimensions), to indicate to a user that the end of a list has been reached. Distortion effects can visually amplify the state of having reached a particular location in (e.g., the end of) a collection of data.

Described techniques and tools are not limited to lists, and can be applied to any collection of data that can be manipulated by moving (e.g., vertical or horizontal scrolling) through the data. For example, described techniques and tools can be used in an email viewer, such that text in the last lines of an email can be distorted (e.g., squeezed or compressed) to indicate that the end of the email message has been reached.

Distortion effects can be presented in different ways. For example, a distortion effect can be held in place for different lengths of time depending on user input and/or design choice. A distortion effect can end, for example, when a user lifts a finger, stylus or other object to end an interaction with a touchscreen after reaching the end of a list. As another example, distortion effects other than a squish, squeeze or compression can be used. One alternative distortion effect is a visual stretch of elements at the end of a list. A stretch effect can be used, for example, in combination with a snap-back animation to indicate that the end of a list has been reached.

Distortion effects can be presented in combination with other user interface features. For example, if a user scrolls to the end of a vertically-oriented list, causing a distortion of text or images at the end of the list, the user interface also can show an element (or part of an element) at the top of the list to indicate that further movement can allow the user to wrap back to the beginning of the list.

Movement in user interface elements (e.g., lists) typically depends to some extent on user interaction. For example, a user that wishes to navigate from one part of a data collection to another provides user input to indicate a desired direction of movement. The user input can then cause movement in the data collection and potentially other elements in the user interface. In some embodiments, a user causes movement in a display area of a device by interacting with a touchscreen. The interaction can include, for example, contacting the touchscreen with a fingertip, stylus or other object and moving it (e.g., with a flicking or sweeping motion) across the surface of the touchscreen to cause movement in a desired direction. Alternatively, a user can interact with a user interface in some other way, such as by pressing buttons (e.g., directional buttons) on a keypad or keyboard, moving a trackball, pointing and clicking with a mouse, making a voice command, etc.

The actual amount and direction of the user's motion that is necessary to produce particular movements can vary depending on implementation or user preferences. For example, a user interface system can include a default setting that is used to calculate the amount of motion (e.g., in terms of pixels) as a function of the size or rate of a user movement. As another example, a user can adjust a touchscreen sensitivity control, such that the same motion of a fingertip or stylus on a touchscreen will produce smaller or larger movements, depending on the setting of the control.

EXAMPLE 1

Using Distortion Effects to Indicate Location in a Data Collection

FIG. 1 is a flow chart showing an example technique 100 for providing a user interface (UI) with distortion effects to indicate a location in a data collection. At 110, a UI system provides a movable data collection to a user. For example, a UI system presents a list of text elements that can be scrolled by interacting with a touchscreen on a mobile device. At 120, the UI system provides a distortion effect to indicate that a particular location in the data collection has been reached. For example, the UI system distorts one or more elements in a vertically scrolling list by reducing the height of the text in the list elements to indicate that the user has reached the end of list.

EXAMPLE 2

UI with Text Distortion Effects to Indicate Location in a Contact List

Figure 2:
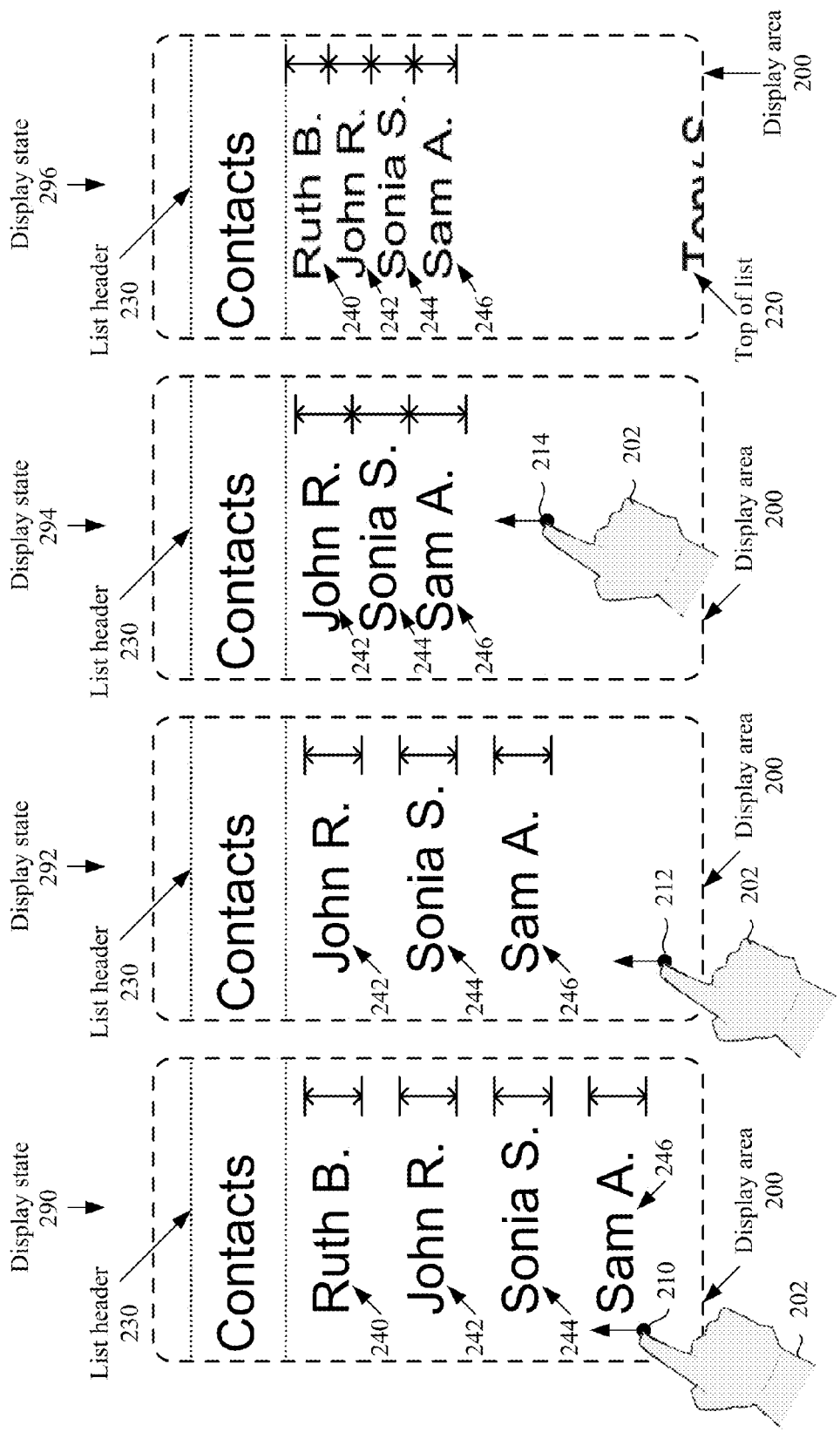
FIGS. 2 and 3 are diagrams showing text distortion effects to indicate location in a data collection, according to one or more described embodiments.

FIG. 2 is a diagram showing a graphical user interface (GUI) presented by a UI system that uses distortion effects to indicate a location in a vertically scrolling contact list on a display having a display area 200. The display area 200 has dimensions typical of displays on smartphones or similar mobile computing devices. According to the example shown in FIG. 2, a user 202 (represented by the hand icon) interacts with a list comprising a list header 230 and list elements 220 and 240-246. In this example, list elements 240-246 indicate contacts, with a contact name (e.g., "Ruth B.") displayed in text. List elements 240-246 can act as links which direct the user to further information (e.g., a phone number, email address, or other information for the contact) when activated.

FIG. 2 shows example display states 290-296. In display states 290-294, user 202 interacts with the touchscreen by making upward motions 210-214, which are each indicated by an upward-pointing arrow. The interaction can include, for example, contacting the touchscreen with a fingertip, stylus or other object and moving it (e.g., with a flicking or sweeping motion) along the surface of the touchscreen. Although FIG. 2 shows user 202 interacting with the touchscreen at particular locations in the display area 200, the UI system allows interaction with other parts of the touchscreen to cause movement in the list. Furthermore, although the example shown in FIG. 2 shows user 202 making upward motions to scroll towards the end of the list, user 202 also can make other motions (e.g., downward motions to scroll towards the beginning of the list). The system can interpret different kinds of upward or downward user movements, even diagonal movements extending to the right or left of the vertical plane, as a valid upward or downward motion.

From display state 290, upward motion 210 causes an upward movement in the list and leads to display state 292, in which list element 240 is no longer visible, and list elements 242-246 have moved up. List header 230 remains in place. In display state 292, user 202 is given a first indication that the end of the list has been reached when no list elements appear below list element 246.

From display state 292, upward motion 212 causes an upward movement of visible list elements 242-246 and leads to display state 294, in which the space between visible list elements 242-246 has been reduced. List header 230 remains in place. In display state 294, user 202 is given a second indication that the end of the list has been reached when the space between visible list elements 242-246 has been reduced.

From display state 294, upward motion 214 causes a distortion effect in display state 296, in which list elements 242-246 are squeezed or compressed in a vertical dimension. In addition, list element 240 is again visible as the text in list elements 242-246 is compressed below list element 240. The compression is indicated by the reduced length of the dimension lines to the right of list elements 240-246, respectively. List header 230 remains in place, and the text in the list header is uncompressed. In display state 296, the distortion effect gives user 202 a third indication that the end of the list has been reached. In addition, list element 220 at top of the list is partially visible, providing a fourth indication that the end of the list has been reached. If wrapping functionality is available, the partial view of list element 220 also can provide an indication that further movement can cause the list to wrap back to the top of the list.

Upward motions 210-214 are only examples of possible user interactions. The same motions 210-214 and/or other user interactions (e.g., motions having different sizes, directions, or velocities) can cause different effects, different display states, different transitions between display states, etc. For example, some display states (e.g., display state 296) may occur only if an upward motion is larger than a threshold motion. As another example, a UI system can transition directly from display state 290 to display state 294, from display state 290 to display state 296, etc., in response to a single user interaction (e.g., upward motion 210 in display state 290, or a motion of larger size or greater velocity).

Display states 290-296 are only examples of possible display states. In practice, a display can exist in any number of states (e.g., in intermediate states between example states 290-296, in states with different visible UI elements, etc.) in addition to, or as alternatives to, the example display states 290-296. Depending on implementation, different display states can provide more or fewer indications of location in a data collection. For example, when the end of a list is reached a UI system can provide a distortion effect by compressing the list elements 240-246 shown in display state 290 without moving the list elements up in the display area 200 or reducing the space between the list elements.

EXAMPLE 3

UI with Text Distortion Effects to Indicate Location in a Message List

Figure 3:
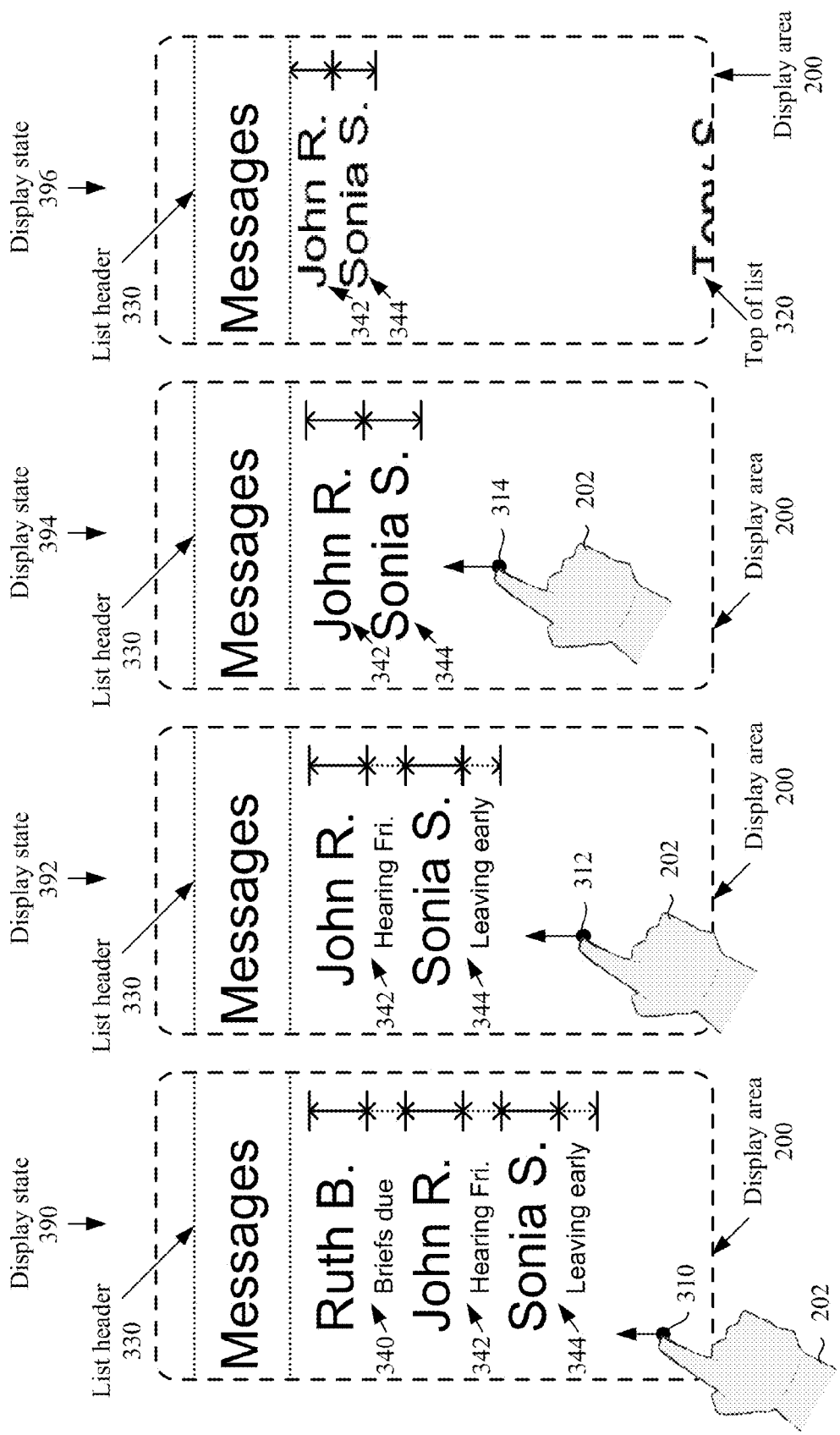

FIG. 3 is a diagram showing a GUI presented by a UI system that uses distortion effects to indicate a location in a vertically scrolling message list on a display having a display area 200. The display area 200 has dimensions typical of displays on smartphones or similar mobile computing devices. According to the example shown in FIG. 3, a user 202 (represented by the hand icon) interacts with a list comprising a list header 330 and list elements 320 and 340-344. In this example, list elements 340-344 indicate messages, with a contact name (e.g., "Ruth B.") displayed in larger text above a subject line (e.g., "Briefs due") in smaller text. List elements 320 and 340-344 can act as links which direct the user to further information (e.g., the full message) when activated.

FIG. 3 shows example display states 390-396. In display states 390-394, user 202 interacts with a touchscreen by making upward motions 310-314, which are each indicated by an upward-pointing arrow. The interaction can include, for example, contacting the touchscreen with a fingertip, stylus or other object and moving it (e.g., with a flicking or sweeping motion) along the surface of the touchscreen. Although FIG. 3 shows user 202 interacting with the touchscreen at particular locations in the display area 200, the UI system allows interaction with other parts of the touchscreen to cause movement in the list. Furthermore, although the example shown in FIG. 3 shows user 202 making upward motions to scroll towards the end of the list, user 202 also can make other motions e.g., downward motions to scroll towards the beginning of the list). The system can interpret different kinds of upward or downward user movements, even diagonal movements extending to the right or left of the vertical plane, as a valid upward or downward motion.

From display state 390, upward motion 310 causes an upward movement in the list and leads to display state 392, in which list element 340 is no longer visible, and list elements 342 and 344 have moved up. List header 330 remains in place. In display state 392, user 202 is given a first indication that the end of the list has been reached when no list elements appear below list element 344.

From display state 392, upward motion 312 causes an upward movement of visible list elements 342 and 344 and leads to display state 394, in which the space between visible list elements 342 and 344 has been reduced. In addition, the subject lines for each message are no longer visible. List header 330 remains in place. In display state 394, user 202 is given a second indication that the end of the list has been reached when the space between visible list elements 342 and 344 has been reduced, and a third indication when the subject lines are no longer visible.

From display state 394, upward motion 314 causes a distortion effect in display state 396, in which list elements 342 and 344 are squeezed or compressed in a vertical dimension. The compression is indicated by the reduced length of the dimension lines to the right of list elements 342 and 344, respectively. List header 330 remains in place, and the text in list header 330 is uncompressed. The distortion effect gives user 202 a fourth indication that the end of the list has been reached. In addition, list element 320 at top of the list is partially visible, providing a fifth indication that the end of the list has been reached. If wrapping functionality is available, the partial view of list element 320 also can provide an indication that further downward movement can cause the list to wrap back to the top of the list.

Upward motions 310-314 are only examples of possible user interactions. The same motions 310-314 and/or other user interactions (e.g., motions having different sizes, directions, or velocities) can cause different effects, different display states, different transitions between display states, etc. For example, some display states (e.g., display state 396) may occur only if a motion is larger than a threshold motion. As another example, a UI system can transition directly from display state 390 to display state 394, from display state 394 to display state 396, etc., in response to a single user interaction (e.g., upward motion 310 in display state 390, or a motion of larger size or greater velocity).

Display states 390-396 are only examples of possible display states. In practice, a display can exist in any number of states (e.g., in intermediate states between example states 390-396, in states with different visible UI elements, etc.) in addition to, or as alternatives to, the example display states 390-396. Depending on implementation, different display states can provide more or fewer indications of location in a data collection. For example, a UI system can provide a distortion effect by compressing the list elements 340-344 shown in display state 390 without moving the list elements 340-344 up in the display area 200 or reducing the space between the list elements.

EXAMPLE 4

UI with Image Distortion Effects to Indicate Location in a List

Figure 4A:
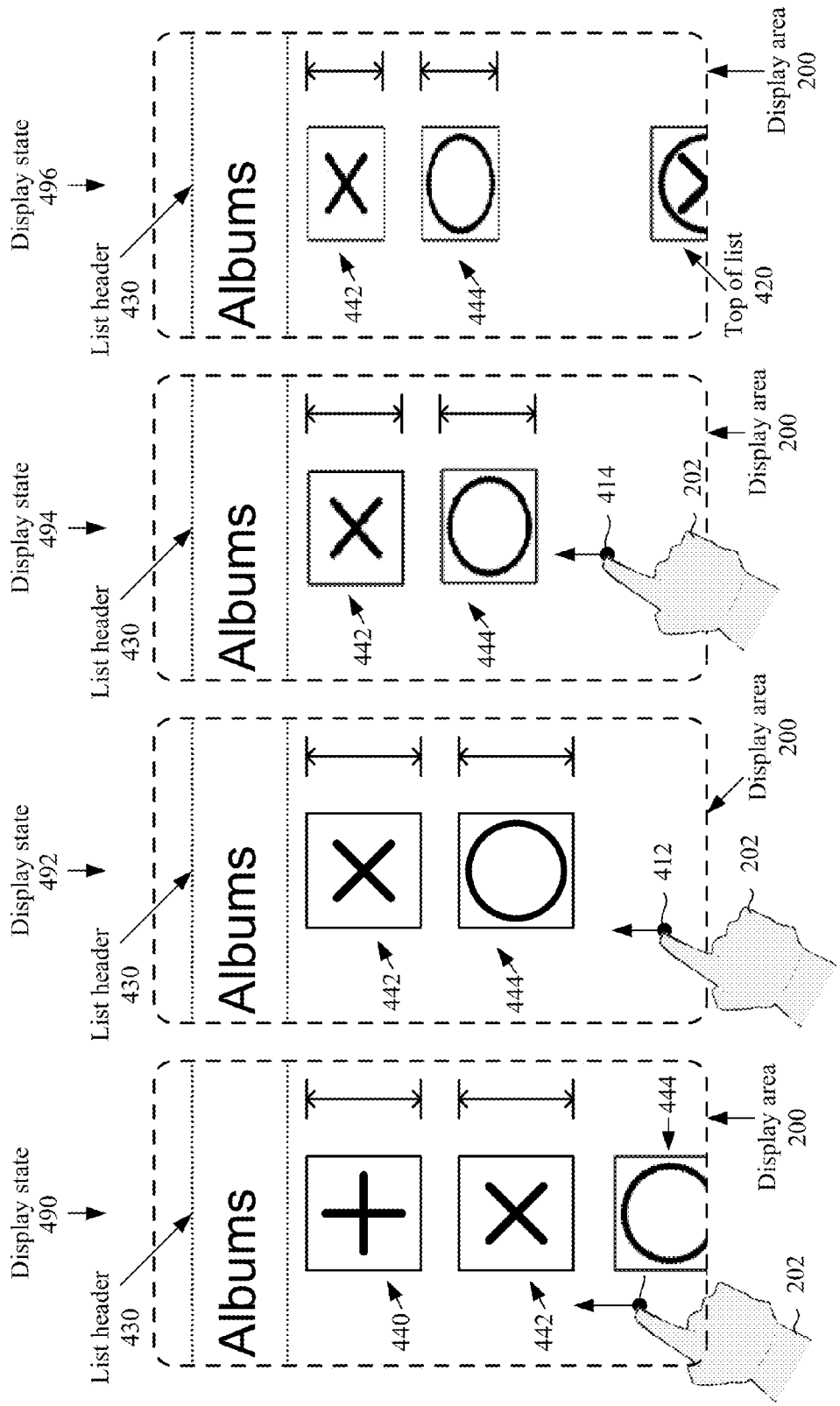
FIGS. 4A-4B are diagrams showing image distortion effects to indicate location in a data collection, according to one or more described embodiments.
Figure 4B:
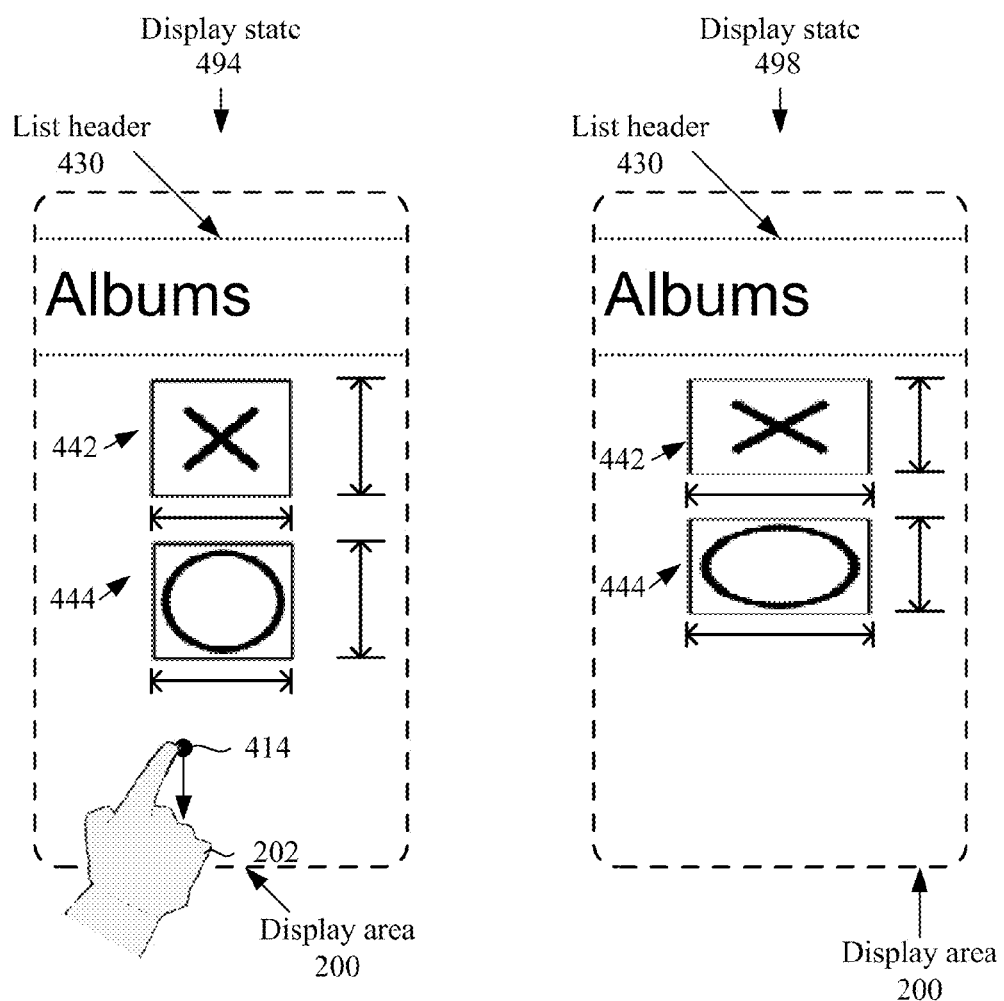

FIGS. 4A-4B are diagrams showing a GUI presented by a UI system that uses image distortion effects to indicate a location in a vertically scrolling list on a display having a display area 200. The display area 200 has dimensions typical of displays on smartphones or similar mobile computing devices. According to the example shown in FIGS. 4A-4B, a user 202 (represented by the hand icon) interacts with a list comprising a list header 430 and list elements 420 and 440-444. In this example, list elements 440-444 are images representing music albums. List elements 420 and 440-444 can act as links which direct the user to further information (e.g., a title and track listing for the corresponding album) when activated.

FIGS. 4A-4B show example display states 490-498. In display states 490-494, user 202 interacts with a touchscreen by making upward motions 410-414, which are each indicated by an upward-pointing arrow. The interaction can include, for example, contacting the touchscreen with a fingertip, stylus or other object and moving it (e.g., with a flicking or sweeping motion) along the surface of the touchscreen. Although FIG. 4A shows user 202 interacting with the touchscreen at particular locations in the display area 200, the UI system allows interaction with other parts of the touchscreen to cause movement in the list. Furthermore, although the example shown in FIGS. 4A-4B shows user 202 making upward motions to scroll towards the end of the list, user 202 also can make other motions (e.g., downward motions to scroll towards the beginning of the list). The UI system can interpret different kinds of upward or downward user movements, even diagonal movements extending to the right or left of the vertical plane, as a valid upward or downward motion.

From display state 490, upward motion 410 causes an upward movement in the list and leads to display state 492, in which list element 440 is no longer visible, and list elements 442 and 444 have moved up. List header 430 remains in place. In display state 492, user 202 is given a first indication that the end of the list has been reached when no list elements appear below list element 444.

From display state 492, downward motion 412 causes an upward movement of visible list elements 442 and 444 and a distortion effect in display state 494, in which list elements 442 and 444 are squeezed or compressed in a vertical dimension. The compression is indicated by the reduced length of the dimension lines to the right of list elements 442 and 444, respectively. The space between visible list elements 442 and 444 has not changed. List header 430 remains in place. The distortion effect gives user 202 a second indication that the end of the list has been reached.

From display state 494, upward motion 414 causes a further distortion effect in display state 496, in which list elements 442 and 444 are further squeezed or compressed in the vertical dimension. The additional compression is indicated by the reduced length of the dimension lines (compared to display state 494) to the right of list elements 442 and 444, respectively. List header 430 remains in place, and the text in list header 430 is uncompressed. The further distortion effect gives user 202 a third indication that the end of the list has been reached. In addition, list element 420 at top of the list is partially visible, providing a fourth indication that the end of the list has been reached. If wrapping functionality is available, the partial view of list element 420 also can provide an indication that further movement can cause the list to wrap back to the top of the list.

FIG. 4B also shows display state 494 along with an alternative display state 498. In the example shown in FIG. 4B, upward motion 414 in display state 494 causes an additional distortion effect in display state 498, in which list elements 442 and 444 are also stretched or expanded in a horizontal dimension, in addition to being squeezed or compressed in the vertical dimension. This additional distortion effect can give the impression of an object, such as a rubber ball, colliding with a surface. The horizontal stretch is indicated by the increased length of the dimension lines (compared to display state 494) below list elements 442 and 444, respectively. List header 430 remains in place, and the text in list header 430 is not distorted. The additional distortion effect gives user 202 an alternative indication that the end of the list has been reached.

Upward motions 410-414 are only examples of possible user interactions. The same motions 410-414 and/or other user interactions (e.g., motions having different sizes, directions, or velocities) can cause different effects, different display states, different transitions between display states, etc. For example, some display states (e.g., display state 496) may occur only if a motion is larger than a threshold motion. As another example, a UI system can transition directly from display state 490 to display state 494, from display state 490 to display state 496, etc., in response to a single user interaction (e.g., upward motion 410 in display state 490, or a motion of larger size or greater velocity).

Display states 490-498 are only examples of possible display states. In practice, a display can exist in any number of states (e.g., intermediate states between example states 490-498, states with different visible UI elements, etc.) in addition to, or as alternatives to, the example display states 490-498. Depending on implementation, different display states can provide more or fewer indications of location in a data collection. For example, a UI system can provide a distortion effect by compressing the list elements 440-444 without moving the list elements up in the display area 200.

EXAMPLE 5

Squeeze Points and Off-screen Elements

Figure 5:
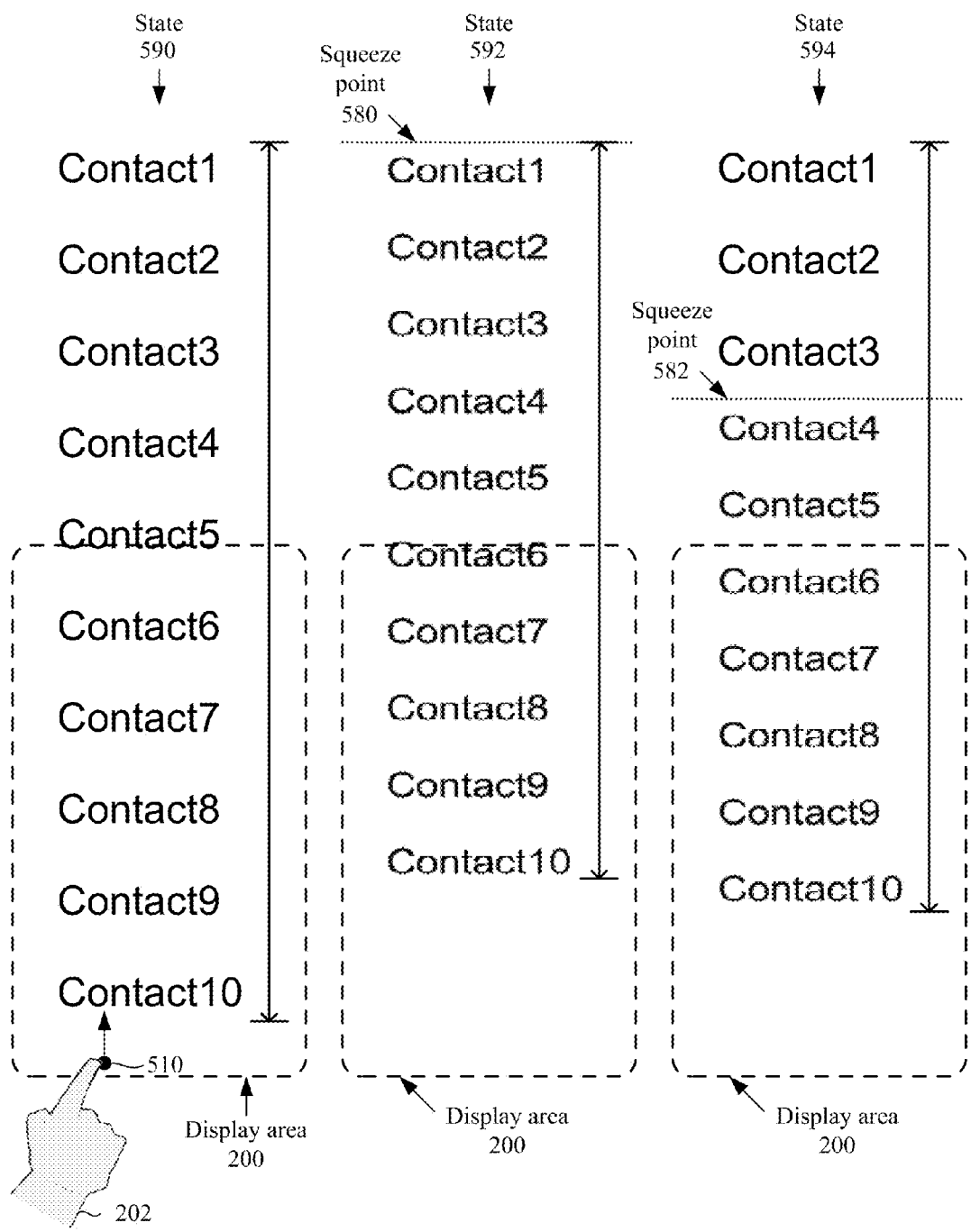
FIG. 5 is a diagram showing distortion effects in other portions of a data collection, such as elements outside a display area, according to one or more described embodiments.

FIG. 5 is a diagram showing a graphical user interface (GUI) presented by a UI system that uses squeeze points for distortion effects. According to the example shown in FIG. 5, a user 202 (represented by the hand icon) interacts with a list comprising list elements ("Contact1," "Contact2," etc.). In this example, distortion effects depend at least in part on the location of squeeze points 580, 582. Some list elements with distortion effects are shown as being outside display area 200.

FIG. 5 shows example states 590-294. In state 590, user 202 interacts with the touchscreen by making an upward motion 510, indicated by an upward-pointing arrow. The interaction can include, for example, contacting the touchscreen with a fingertip, stylus or other object and moving it (e.g., with a flicking or sweeping motion) along the surface of the touchscreen. Although FIG. 5 shows user 202 interacting with the touchscreen at particular locations in the display area 200, the UI system allows interaction with other parts of the touchscreen to cause movement in the list. Furthermore, although the example shown in FIG. 5 shows user 202 making upward motions to scroll towards the end of the list, user 202 also can make other motions (e.g., downward motions to scroll towards the beginning of the list). The UI system can interpret different kinds of upward or downward user movements, even diagonal movements extending to the right or left of the vertical plane, as a valid upward or downward motion.

From state 590, upward motion 510 causes a distortion effect. States 592 and 594 show example states with distortion effects that can be caused by upward motion 510. The distortion effects indicate that the end of the list has been reached. In the example shown in state 592, the entire list is treated as a single surface, as indicated by the single dimension line to the right of the list in states 590, 592 and 594, respectively. In state 592, the list has been squeezed or compressed in a vertical dimension, as shown by the reduced length of the dimension to the right of the list. The text of each list element has been squeezed or compressed in a vertical dimension. The elements are distorted proportionally. The effect in state 592 is as if all the list elements are being compressed against a barrier at the squeeze point 580.

In state 594, the list has been squeezed or compressed in a vertical dimension, as shown by the reduced length of the dimension to the right of the list. However, the text has not been squeezed in some of the list elements (e.g., "Contact1," "Contact2" and "Contact3"). The effect in state 594 is as if the list elements below the squeeze point 582 are being compressed against a barrier at the squeeze point 582. In this example, the list also can be considered as having two parts—one part above the squeeze point, and one part below the squeeze point—where only one part of the list is squeezed. The elements in the part of the list that is squeezed are distorted proportionally.

In the examples shown in state 592 and state 594, the squeeze points 580, 582 are indicated at particular locations in a list, outside the display area 200. Other squeeze points are also possible. For example, the squeeze point could be at the center of a list (e.g., at item 50 in a 100 item list) or in a visible portion of a list. The squeeze point can change dynamically, depending on the state of the list and/or display. For example, a squeeze point can move up or down (e.g., in response to where the "center" of the list is) as elements are added to or removed from the list, or a squeeze point can update automatically to be at the top of a visible portion of the list (e.g., when the end of the list has been reached).

Upward motion 510 is only an example of a possible user interaction. The same motion 510 and/or other user interactions (e.g., motions having different sizes, directions, or velocities) can cause different effects, different display states, different transitions between display states, etc.

States 590-594 are only examples of possible states. In practice, a display and/or data collection can exist in any number of states (e.g., in intermediate states between example states 590-594, in states with different visible UI elements, etc.) in addition to, or as alternatives to, the example display states 590-594.

EXAMPLE 6

Changes in Display Orientation

Described techniques and tools can be used on display screens in different orientations, such as landscape orientation. Changes in display orientation can occur, for example, where a UI has been configured (e.g., by user preference) to be oriented in landscape fashion, or where a user has physically rotated a device. One or more sensors (e.g., an accelerometer) in the device can be used to detect when a device has been rotated, and adjust the display orientation accordingly.

In the example shown in FIG. 6, the display area 200 is oriented in landscape fashion. Content (e.g., data collection elements 640-644 in content layer 630) and/or other user interface features in the display area 200 can be dynamically adjusted to take into account effects of a reorientation (e.g., a new effective width of the display area 200, interpreting directions of user interactions differently, etc.). For example, distortion effects can be adjusted, such as by compressing data collection elements in a horizontal dimension instead of a vertical dimension, to account for display reorientation.

However, such adjustments are not required. For example, if a display area has equal height and width, reorientation of the display area to a landscape orientation will not change the effective width of the display area.

II. Multi-layer Graphical User Interface with Distortion Effects

Distortion effects can be used in combination with other user interface features to provide additional benefits for users. For example, by providing UI layers (e.g., parallel layers or layers that are at least substantially parallel) and allowing the layers to move in different ways (e.g., at different speeds), a UI system can provide context for information that a user is viewing when there is more information relevant to the user's current activity that is not visible on the display. Distortion effects can be used, for example, to indicate locations in data collections in a multi-layer UI.

In described embodiments, a multi-layer UI system presents UI layers that move at different speeds relative to one another. The rate of movement in each layer can depend on several factors, including the amount of data to be presented visually (e.g., text or graphics) in the layer, or the relative distance between corresponding lock points, which are described in more detail below. The amount of data to be presented visually in a layer can measured by, for example, determining the length as measured in a horizontal direction of the data as rendered on a display or as laid out for possible rendering on the display. Length can be measured in pixels or by some other suitable measure (e.g., the number of characters in a string of text). A layer with a larger amount of data and moving at a faster rate can advance by a number of pixels that is greater than a layer with a smaller amount of data moving at a slower rate. Layer movement rates can be determined in different ways. For example, movement rates in slower layers can be derived from movement rates in faster layers, or vice versa. Or, layer movement rates can be determined independently of one another.

When user interaction causes movement in layers, the movement of the layers is a typically a function of the length of the layers and the size and direction of the motion made by the user. For example, a leftward flicking motion on a touchscreen produces a leftward movement of the layers relative to the display area. Depending on implementation and/or user preferences, user input can be interpreted in different ways to produce different kinds of movement in the layers. For example, a multi-layer UI system can interpret any movement to the left or right, even diagonal movements extending well above or below the horizontal plane, as a valid leftward or rightward motion of a layer, or the system can require more precise movements. As another example, a multi-layer UI system can require that a user interact with apart of a touchscreen corresponding to the display area occupied by a layer before moving that layer, or the system can allow interaction with other parts of the touchscreen to cause movement in a layer. As another example, a user can use an upward or downward motion to scroll up or down in a part of the content layer that does not appear on the display all at once, such as a list of elements, and such upward/downward motion can even be combined with left/right motion for diagonal movement effects.

In some embodiments, UI elements (e.g., layers, lists, etc.) include "lock points." Lock points in layers indicate corresponding positions with which a display area of a device will be aligned. For example, when a user navigates to a position on a content layer such that the left edge of the display area is at a left-edge lock point "A," the left edge of display area will also be aligned at a corresponding left-edge lock point "A" in each of the other layers. Lock points also can indicate alignment of a right edge of a display area (right-edge lock points), or other types of alignment (e.g., center lock points). Typically, corresponding lock points in each layer are positioned to account for the fact that layers will move at different speeds. For example, if the distance between a first lock point and a second lock point in a content layer is twice as great as the distance between corresponding first and second lock points in a background layer, the background layer moves at half the rate of the content layer when transitioning between the two lock points.

In addition to indicating corresponding positions in layers, lock points can exhibit other behavior. For example, lock points can indicate positions in a content layer to which the layer will move when the lock point comes into view on the display. This can be useful, for example, when an image, list or other content element comes partially into view near an edge of the display area—the content layer can automatically bring the content element completely into view by moving the layer such that an edge of the display area aligns with an appropriate lock point. A "lock animation" can be performed at the end of a navigation event, such as a flick or pan gesture, to align the layers with a particular lock point. In the event that a navigation event produces a user-generated movement that does not align precisely with a lock point, a lock animation can be used. As an example, a lock animation can be performed at the end of a navigation event that causes movement of a content layer to a position between two content panes (e.g., where portions of two content panes are visible in a display area). A multi-layer UI system can check which content pane occupies more space in the display area and transition to that pane using the lock animations. This can improve the overall look of the layers and can be effective in bringing information or functionality into view in a display area.

Lock points also can be useful to provide a locking "notch" or "bump" effect during navigation. For example, as a user navigates along the length of a content layer, the layer can stop at lock points (e.g., at regularly spaced intervals, between content elements, etc.) after each navigation movement (e.g., a flick or pan motion on a touchscreen) made by the user.

Motion in layers and/or other elements, such as lists, can be calculated based on motion ratios. For example, a UI system can calculate motion ratios for a background layer and a title layer by dividing the width of the background layer and the width of the title layer, respectively, by a maximum width of the content layer. Taking into account the widths of the background layer and the title layer, a UI system can map locations of lock points in the background layer and the title layer, respectively, based on the locations of corresponding lock points in the content layer.

Movement of various layers can differ depending on context. For example, a user can navigate left from the beginning of a content layer to reach the end of a content layer, and can navigate right from the end of the content layer to reach the beginning of a content layer. This "wrapping" feature provides more flexibility when navigating through the content layer. Wrapping can be handled by the multi-layer UI system in different ways. For example, wrapping can be handled by producing an animation that shows a rapid transition from the end of layers such as title layers or background layers back to the beginning of such layers, or vice-versa. Such animations can be combined with ordinary panning movements in the content layer, or with special animations in the content layer. However, wrapping functionality is not required.

EXAMPLE 7

Distortion Effects in Multi-layer UI

FIG. 6 is a diagram showing multiple layers in a GUI presented by a multi-layer system with two layers 630, 632 for a display having a display area 200 with dimensions typical of displays on smartphones or similar mobile computing devices. The content layer 632 includes content elements 640-644. In this example, each content element 640-644 comprises an image representing a music album, and text indicating the title of the respective album. The list header layer 630 includes a text string ("Albums"). According to the example shown in FIG. 6, a user 202 represented by the hand icon) interacts with content layer 632 by interacting with a touchscreen having the display area 200. The interaction can include, for example, contacting the touchscreen with a fingertip, stylus or other object and moving it (e.g., with a flicking or sweeping motion) across the surface of the touchscreen.

FIG. 6 shows example display states 690-694. In display states 690 and 692, user 202 interacts with a touchscreen by making leftward motions 610 and 612, respectively, which are each indicated by a leftward-pointing arrow. The interaction can include, for example, contacting the touchscreen with a fingertip, stylus or other object and moving it (e.g., with a flicking or sweeping motion) across the surface of the touchscreen. Although FIG. 6 shows user 202 interacting with the touchscreen at particular locations in the display area 200, the UI system allows interaction with other parts of the touchscreen to cause movement in the list. Furthermore, although the example shown in FIG. 6 shows user 202 making leftward motions to scroll towards the end of the list, user 202 also can make other motions (e.g., rightward motions to scroll towards the beginning of the list). The UI system can interpret different kinds of leftward or rightward user movements, even diagonal movements extending below or above the horizontal plane, as a valid leftward or rightward motion.

When the user input indicates a motion to the right or left, the UI system produces a rightward or leftward movement of the layers 630, 632 relative to the display area 200. The amount of movement of the layers 630, 632 is a function of the data in the layers and the size or rate of the motion made by the user 202. For example, from display state 690, leftward motion 610 causes a leftward movement in the content layer and leads to display state 692, in which element 640 is no longer visible, and elements 642 and 644 have moved to the left. The text string ("Albums") in the list header layer 630 also has moved to the left, but at a slower rate (in terms of pixels) than the content layer 632.

From display state 692, leftward motion 612 causes a leftward movement of the content layer 632 and leads to display state 694, in which element 642 is no longer visible. Leftward motion 612 also causes a distortion effect in display state 694, in which an image and text in element 644 is squeezed or compressed in a horizontal dimension. The compression is indicated by the reduced length of the dimension lines above the image and text ("Rock & Roll Part III") of element 644, respectively. The text string ("Albums") in the list header layer 630 also has moved to the left, but at a slower rate (in terms of pixels) than the content layer 632. The text in list header layer 630 is uncompressed. The distortion effect gives user 202 an indication that the end of the content layer 632 has been reached. In addition, element 640 at the beginning of the collection is partially visible, providing another indication that the end of the content layer 632 has been reached. If wrapping functionality is available, the partial view of element 640 also can provide an indication that further movement can cause the content layer 630 to wrap back to the beginning (e.g., back to display state 690).

Leftward motions 610 and 612 are only examples of possible user interactions. The same motions 610 and 612 and/or other user interactions (e.g., motions having different sizes, directions, or velocities) can cause different effects, different display states, different transitions between display states, etc. For example, some display states (e.g., display state 694) may occur only if a leftward motion is larger than a threshold motion. As another example, a UI system can transition directly from display state 690 to display state 694 in response to a single user interaction (e.g., leftward motion 610 in display state 690, or a motion of larger size or greater velocity), or perform some other transition.

Display states 690-694 are only examples of possible display states. In practice, a display can exist in any number of states (e.g., in intermediate states between example states 690-694, in states with different visible UI elements, etc.) in addition to, or as alternatives to, the example display states 690-694. Depending on implementation, different display states can provide more or fewer indications of location in a data collection. For example, a UI system can provide a distortion effect by compressing the elements 642 and 644 shown in display state 692 without moving the elements 642 and 644 to the left in the display area 200.

EXAMPLE 8

Distortion Effects in Vertical List in Multi-layer UI

FIGS. 7A-7E are diagrams showing a GUI presented by a multi-layer UI system that includes a content layer 714 that moves in tandem with layer 712 above it. In this example, a user 202 (represented by the hand icon) navigates through content layer 714 by interacting with a touchscreen having the display area 200. The interaction can include, for example, contacting the touchscreen with a fingertip, stylus or other object and moving it (e.g., with a flicking or sweeping motion) across or along the surface of the touchscreen. The content layer 714 includes game images 740, 742, 744, lists 750, 752, 754, and avatar 730 (which is described in more detail below). The other layers 710, 712 include text information ("Games" in layer 710; "Spotlight," "Xbox Live, "Requests" and "Collection" in layer 712).

Figure 7A:
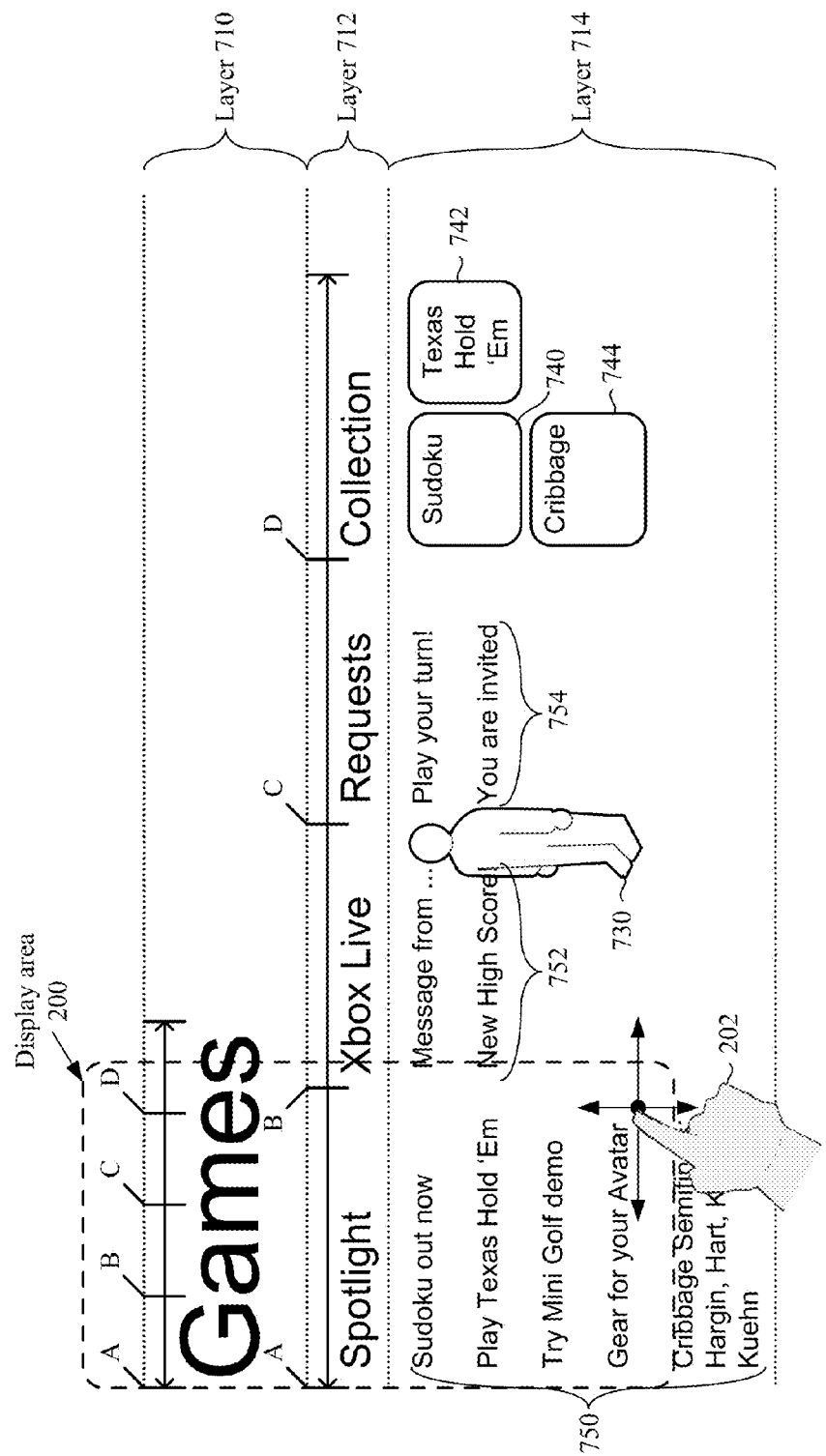
FIGS. 7A-7E are diagrams showing distortion effects to indicate location in a list in a having parallel layers that move at different rates, with list movement orthogonal to layer movement, according to one or more described embodiments.
Figure 7B:
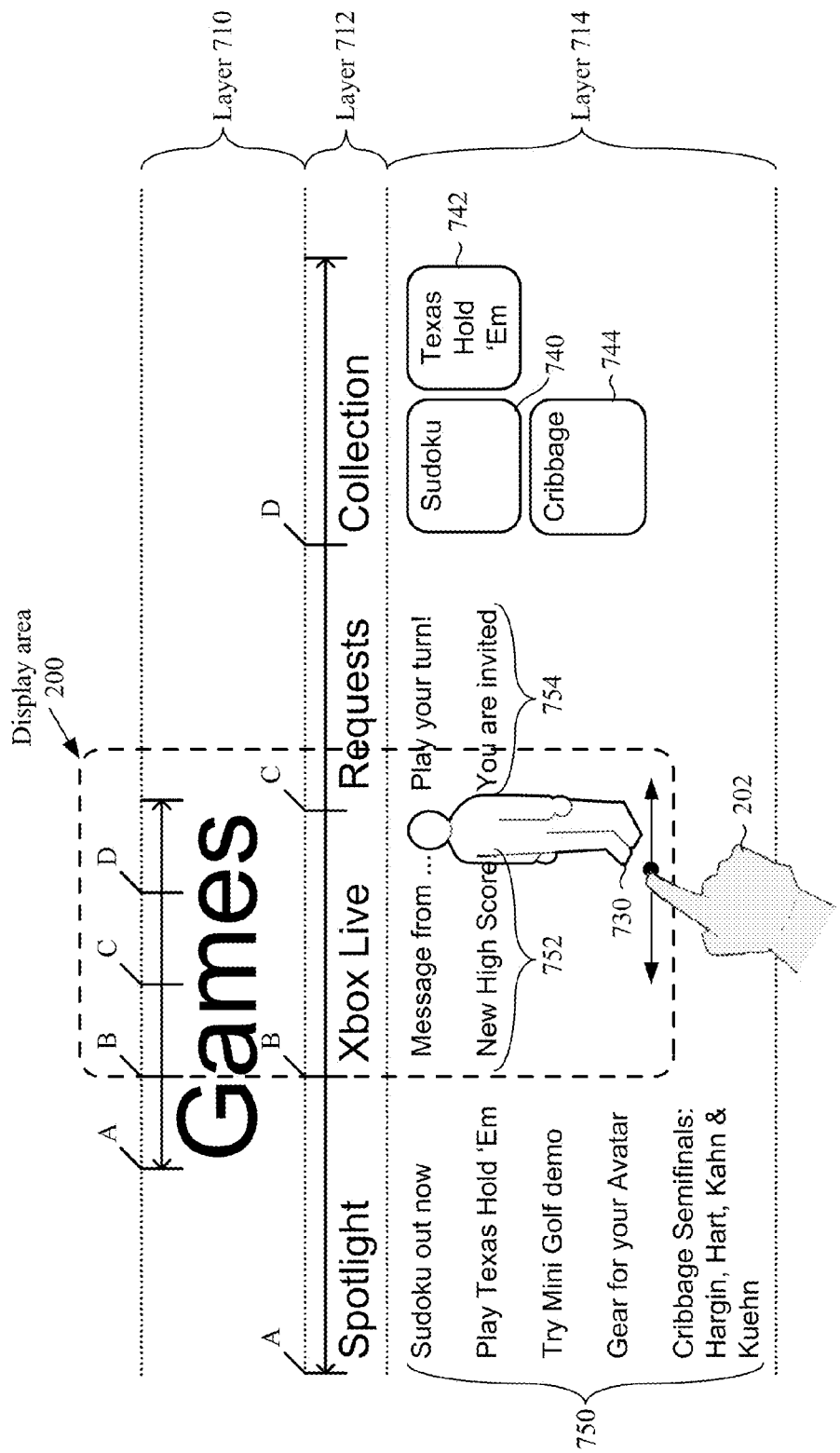
Figure 7C:
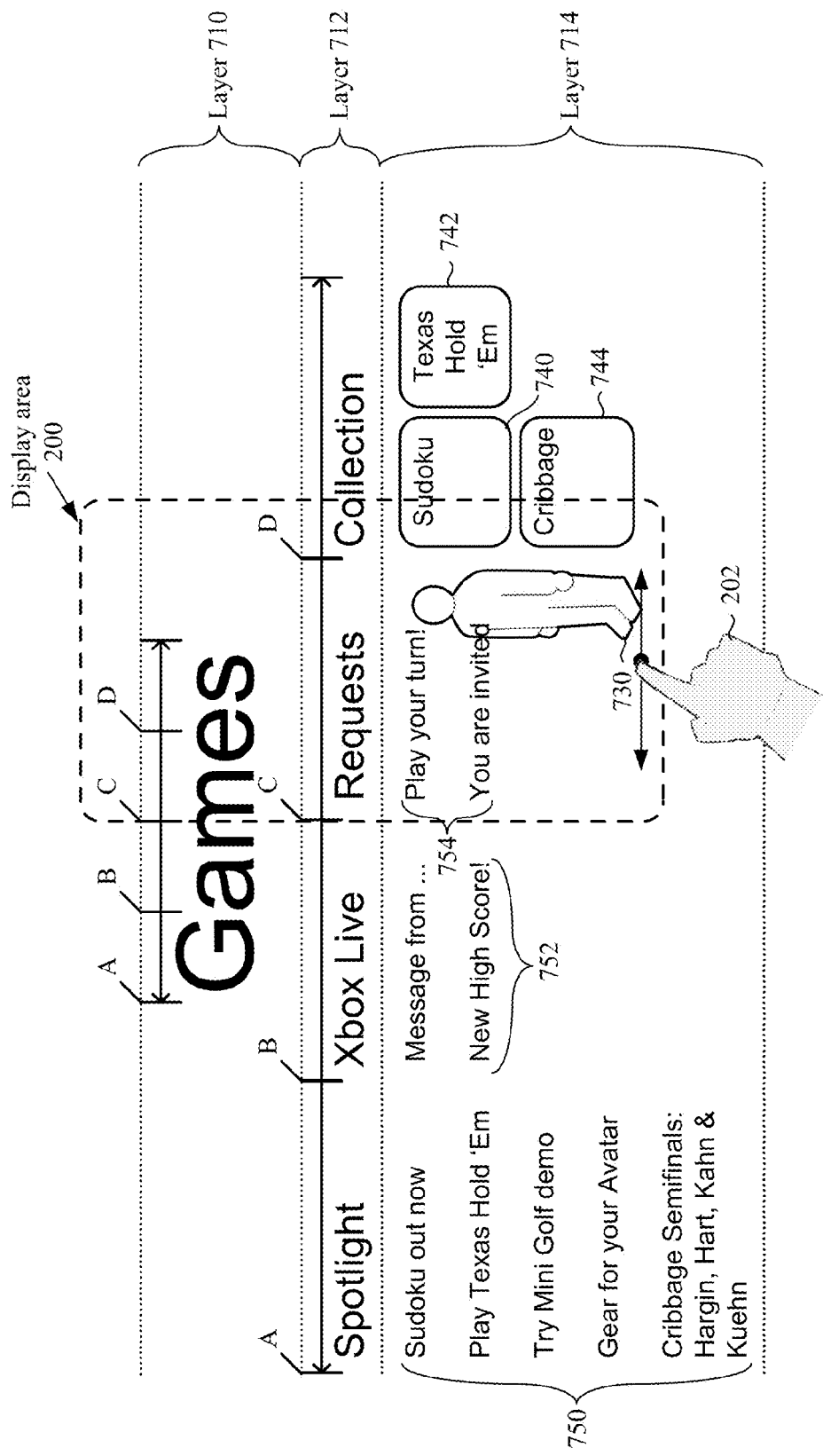
Figure 7D:
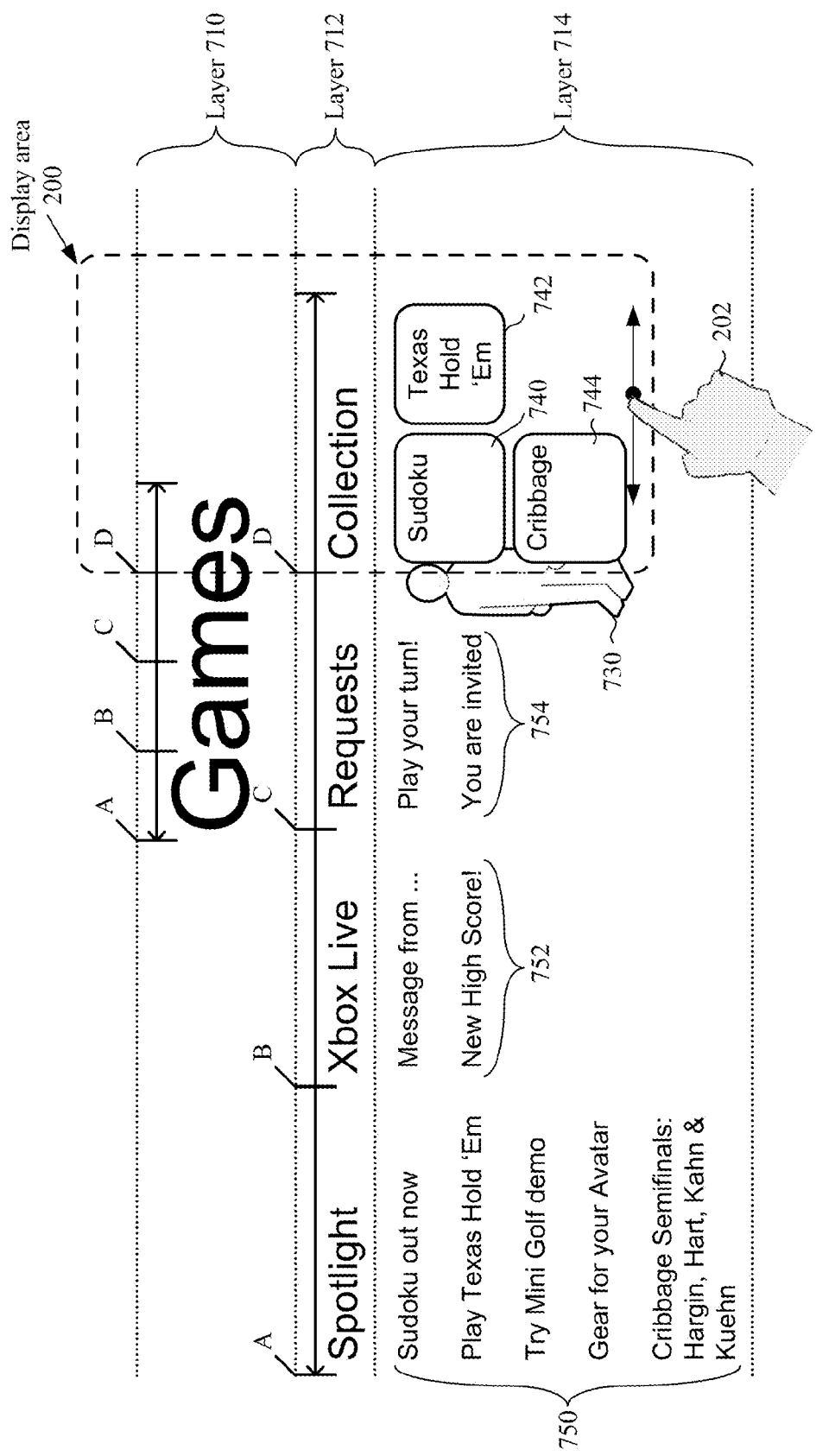
Figure 7E:
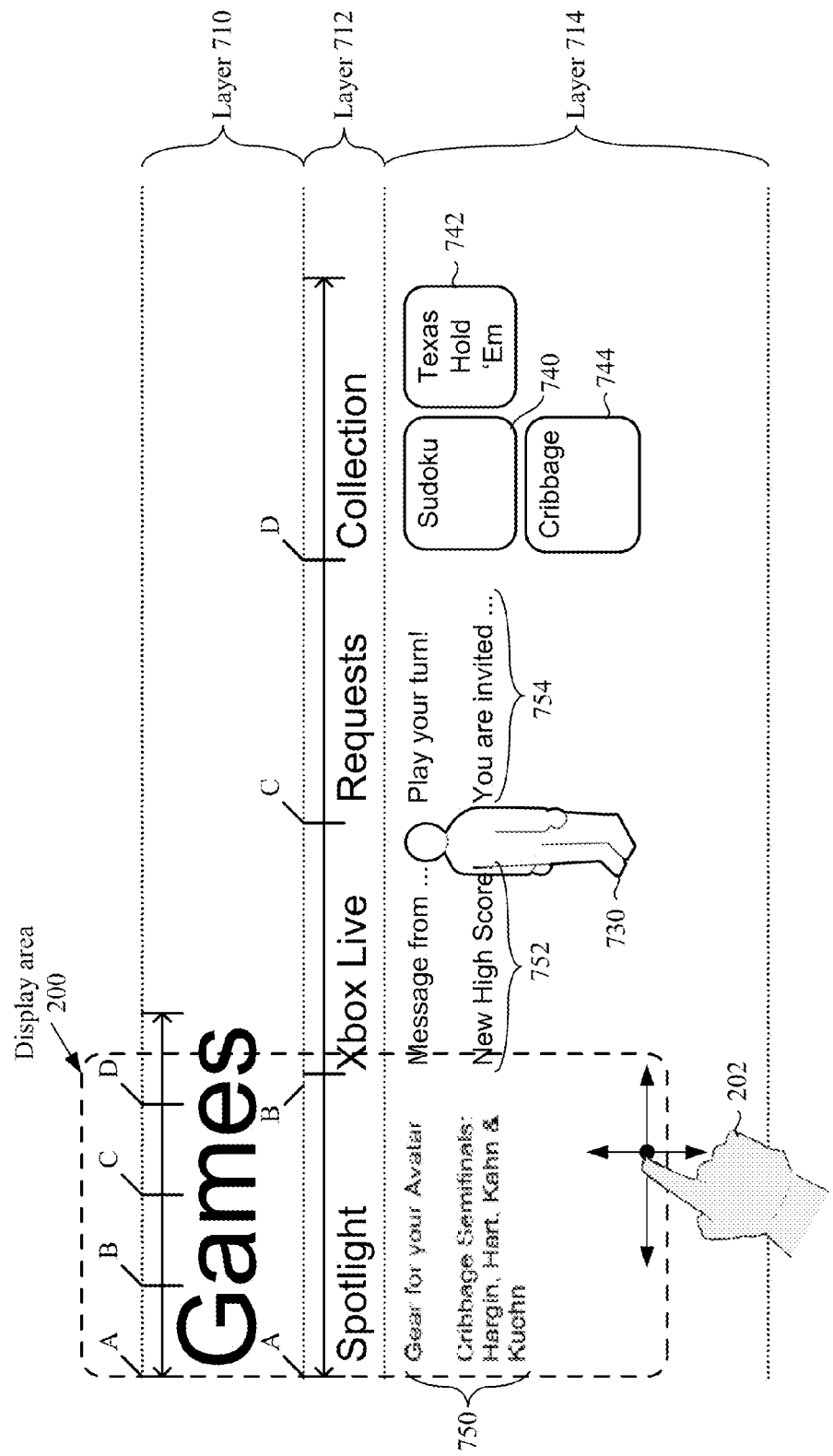

The direction of motion that can be caused by user 202 is indicated by a left-pointing arrow and a right-pointing arrow in FIGS. 7A-7E, along with additional up- and down-pointing arrows in FIGS. 7A and 7E. The right-pointing and left-pointing arrows indicate possible movements (left or right horizontal movements) of the layers 710, 712, 714 in response to user movements. The system can interpret user movements to the left or right, even diagonal movements extending above or below the horizontal plane, as a valid leftward or rightward motion. Although FIGS. 7A-7E show the user 202 interacting with a portion of the display area 200 that corresponds to, for example, the content layer 714, the system also allows interaction with other parts of the touchscreen (e.g., those that correspond to display area occupied by other layers) to cause movement in the layers 710, 712, 714, list 750, or other UI elements.

In addition to movements of entire layers, a user also can cause movements in elements or parts of layers, depending on the data in the layer and how the layer is arranged. For example, a user can cause movements (e.g., vertical movements) in layer elements (e.g., lists) that are orthogonal to movements (e.g., horizontal movements) caused in a layer as a whole. Orthogonal movements of layer elements in layers that move horizontally can include scrolling vertically in a list embedded in a content layer, such as when the list contains more information than can be displayed in a display area. Alternatively, a system that presents layers that move vertically can allow horizontal movements in layer elements.

List 750 in content layer 714 contains more information than is visible in display area 200. The down-pointing and up-pointing arrows indicate possible user movements to cause movements in list 750. The system can interpret upward or downward movements made by user 202, including diagonal movements extending to the left or right of the vertical plane, as a valid upward or downward motion. In the example shown in FIG. 7E, an upward user movement has caused a distortion effect in list 750, in which the text of elements in the list are squeezed or compressed in a vertical dimension. This distortion effect gives user 202 an indication that the end of the list has been reached.

The amount of movement of list 750 can be a function of the size or rate of the motion made by user 202, and the data in list 750. Thus, scrolling of the list 750 can be element-by-element, page-by-page of elements, or something in between that depends on size or rate of the motion. In this example, list 750 includes only one element that is not visible in FIG. 7A, so a range of small or large downward movements may be enough to scroll to the end of list 750.

When user input indicates a motion to the right or left, the system produces a rightward or leftward movement of the layers 710, 712, 714 relative to the display area 200. In this example, the amount of movement of the layers 710, 712, 714 is a function of the data in the layers and the size or rate of the motion made by the user. Horizontal movement in layers 710, 712, 714 proceeds according to the following rules, except during wrapping animations:

1. The horizontal movement of content layer 714 is locked to layer 712.
2. Layers 712 and 714 will each move at approximately three times the rate of layer 710, which is approximately ⅓ the length of layers 712 and 714.

Movement in the layers 710, 712, 714 may differ from the rules described above in some circumstances. In the example shown in FIGS. 7A-7E, wrapping is permitted. The arrows indicate that a user can navigate left from the beginning of the content layer 714 (the position shown in FIG. 7A and FIG. 7E), and can navigate right from the end of the content layer 714 (the position shown in FIG. 7D). During a wrapping animation, some layers may move faster or slower than during other kinds of movements. For example, the text in layer 710 can move faster when wrapping back to the beginning of content layer 714. In FIG. 7D, display area 200 shows portions of two letters in layer 710, at the end of the "Games" text string. A wrapping animation to return to the state shown in FIG. 7A can include bringing the data in layers 710, 712, 714, including the text of layer 710, into view from the right, resulting in a more rapid movement in layer 710 than in other contexts, such as a transition from the state shown FIG. 7A to the state shown in FIG. 7B.

In FIGS. 7A-7E, example lock points "A," "B," "C" and "D" are indicated for layers 710 and 712. In terms of horizontal motion, content layer 714 is locked to layer 712; the lock points indicated for layer 712 also apply to layer 714. The lock points for each layer indicate the corresponding position of the left edge of the display area 200 on each layer. For example, when a user navigates to a position on content layer 714 such that the left edge of the display area 200 is at lock point "A," the left edge of display area 200 also is aligned at lock point "A" of the other layers 710, 712, as shown in FIGS. 7A and 7E. In FIG. 7B, the left edge of the display area 200 is at lock point "B" in each of the layers 710, 712, 714. In FIG. 7C, the left edge of the display area 200 is at lock point "C" in each of the layers 710, 712, 714. In FIG. 7D, the left edge of the display area 200 is at lock point "D" in each of the layers 710, 712, 714.

The lock points shown in FIGS. 7A-7E are not generally representative of a complete set of lock points, and are limited to lock points "A," "B," "C" and "D" only for brevity. For example, right-edge lock points can be added to obtain alignment with the right edge of display area 200, or center lock points can be added to obtain alignment with the center of display area 200. Alternatively, fewer lock points can be used, more lock points can be used, or lock points can be omitted.

User 202 can move left or right in content layer 714 after making an up or down movement in list 750. The current position of list 750 (e.g., the bottom-of-list position indicated in FIG. 7E) can be saved, or the system can revert to a default position (e.g., the top-of-list position indicated in FIG. 7A) when navigating left or right in content layer 714 from list 750. Although the arrows in FIGS. 7A-7E (and other figures) that indicate possible movements are shown for purposes of explanation, the display area 200 can itself display graphical indicators such as arrows or chevrons) of possible movements for the layers and/or list.

EXAMPLE 9

Avatar

In FIGS. 7A-7E, avatar 730 can provide a visual cue to indicate a relationship between or draw attention to parts of the content layer 714.

In FIG. 7B, avatar 730 is positioned between list 752 and list 750. In FIG. 7C, avatar 730 floats behind the text of list 754, but remains completely within display area 200. In FIG. 7D, avatar 730 is only partially within display area 200, and the part that is within display area 200 floats behind game icons 740, 742, 744. The positioning of avatar 730 at the left edge of display area 200 can indicate to the user 202 that information associated with avatar 730 is available if the user 202 navigates in the direction of avatar 730. Avatar 730 moves at varying speeds. For example, avatar 730 moves faster in the transition between FIGS. 7B and 7C than it does in the transition between FIGS. 7C and 7D.

Alternatively, avatar 730 can move in different ways, or exhibit other functionality. For example, a UI system can present a distortion effect in avatar 730 to indicate a user's location in a data collection with which the avatar is associated. Avatar 730 also can be locked to particular position (e.g., a lock point) in content layer 714 or in some other layer, such that avatar 730 moves at the same horizontal rate as the layer to which it is locked. As another alternative, avatar 730 can be associated with a list that can be scrolled up or down, such as list 750, and move up or down as the associated list is scrolled up or down.

EXAMPLE 10

UI System

Figure 8:
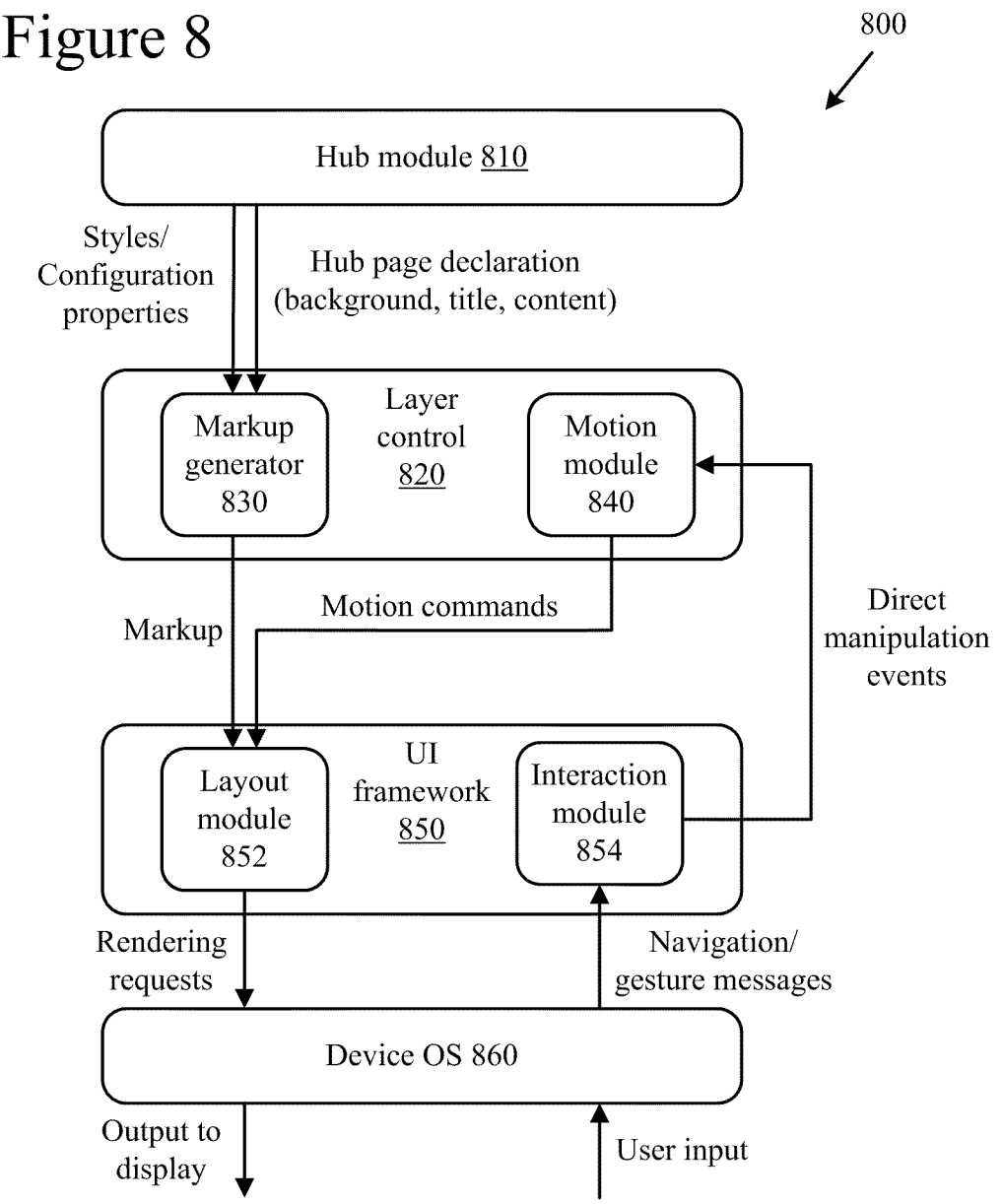
FIG. 8 is a system diagram showing a UI system in which described embodiments can be implemented.

FIG. 8 is a system diagram showing an example UI system 800 that presents a UI on a device (e.g., a smartphone or other mobile computing device). In this example, the UI system 800 is a multi-layer UI system that presents distortion effects in a GUI having multiple layers. Alternatively, the system 800 presents distortion effects without multiple UI layers. The system 800 can be used to implement functionality described in other examples, or other functionality.

In this example, the system 800 includes a hub module 810 that provides a declarative description of a hub page to layer control 820, which controls display of parallel UI layers. Layer control 820 also can be referred to as a "panorama" or "patio" control. Such a description can be used when the UI layers move in a panoramic, or horizontal, fashion. Alternatively, layer control 820 controls UI layers that move vertically, or in some other fashion. Layer control 820 includes markup generator 830 and motion module 840.

In this example, layer control 820 controls several layers of UI elements: e.g., a background layer, a title layer, a section header layer, and a content layer. The content layer includes a set of content panes. Content panes can include, for example, images, graphical icons, lists, text, or other information to be presented visually. A set of content panes in a content layer can be referred to as a "generation" of content panes. Alternatively, layer control 820 controls greater than or less than three layers, or different kinds of layers. As another alternative, such as in a system that presents distortion effects without multiple layers, layer control 820 can be replaced with another control that specifically controls distortion effects.

The declarative description of the hub page includes information that defines a background layer, a title layer, a section header layer, and a content layer. The declarative description of the hub page is provided to markup generator 830, along with other information such as style information and/or configuration properties. Markup generator 830 generates markup that can be used to render the UI layers. Motion module 840 accepts events (e.g., direct UI manipulation events) generated in response to user input and generates motion commands. The motion commands are provided along with the markup to a UI framework 850. In the UI framework 850, the markup and motion commands are received in layout module 852, which generates UI rendering requests to be sent to device operating system (OS) 860. The device OS 860 receives the rendering requests and causes a rendered UI to be output to a display on the device. System components such as hub module 810, layer control 820, and UI framework 850 also can be implemented as part of device OS 860. In one implementation, the device OS 860 is a mobile computing device OS.

A user (not shown) can generate user input that affects the way UI layers are presented. In the example shown in FIG. 8, the layer control 840 listens for direct UI manipulation events generated by UI framework 850. In UI framework 850, direct UI manipulation events are generated by interaction module 854, which receives gesture messages (e.g., messages generated in response to panning or flick gestures by a user interacting with a touchscreen on the device) from device OS 860. Interaction module 854 also can accept and generate direct UI manipulation events for navigation messages generated in response to other kinds of user input, such as voice commands, directional buttons on a keypad or keyboard, trackball motions, etc. Device OS 860 includes functionality for recognizing user gestures and creating messages than can be used by UI framework 850. UI framework 850 translates gesture messages into direction UI manipulation events to be sent to layer control 820.

The system 800 can distinguish between different gestures on the touchscreen, such as drag gestures, pan gestures and flick gestures. The system 800 can also detect a touch gesture, where the user touches and breaks contact with the touchscreen in a particular location, but does not move the finger, stylus, etc. before breaking contact with the touchscreen.

When a user touches the touchscreen and begins a movement while maintaining content with the touchscreen, the system 800 interprets the interaction as a particular gesture depending on the nature of the interaction with the touchscreen. In this example, when the user touches the touchscreen and begins a movement in a horizontal direction while maintaining contact with the touchscreen, the system 800 fires a pan gesture and begins a horizontal movement in the layers. Depending on implementation, the system 800 can continue to fire pane gestures while the user maintains contact with the touchscreen and continues moving. For example, the system 800 can fire a new pan gesture each time the user moves N pixels while maintaining contact with the touch screen. The system 800 can interpret a series of fired pan gestures as a drag gesture. The system can continuously update the contact position and rate of movement. When the user breaks contact with the touchscreen, the system 800 can distinguish between a pan gesture and a flick gesture by determining how quickly the user's finger, stylus, etc., was moving when it broke contact with the touchscreen, and whether the rate of movement exceeds a threshold.

The system 800 can render motion (e.g., motion in a layer), list, or other element) on the display differently depending on the type of gesture. For example, in the case of a drag gesture (in which the user is currently maintaining contact with the touchscreen) on a content layer, the system 800 moves the content layer in a horizontal direction by the same distance as the horizontal distance of the drag. The title layer and background layer also move in response to the drag. The amount of movement is determined by multiplying the motion ratio for the respective layer by the horizontal movement of the drag. For example, if a motion ratio of 0.5 has been determined for the title layer, and the horizontal distance of the drag is 100 pixels, the movement in the title layer is 50 pixels in the direction of the drag.

In the case of a pan gesture (in which the user was moving more slowly, or was stopped, when the user broke contact with the touchscreen) on the content layer, the system 800 moves the content layer in the amount of the pan, and checks the current position of the content pane relative to the display area of the device to determine whether to perform an additional movement in the content layer. For example, the system 800 can perform a locking animation (i.e., an animation of a movement in the content layer to snap to a lock point) and move the content layer to a left or right lock point associated with a current content pane. The system 800 can determine which lock point associated with the current pane is closer, and transition the closer lock point. As another example, the system 800 can move the content layer in order to bring a content pane that is in partial view on the display area into full view. Alternatively, the system 800 can maintain the current position of the content layer.

In the case of a flick gesture (in which the user was moving more rapidly when the user broke contact with the touch-screen) on the content layer, the system 800 can initiate a transition animation that can advance the content layer to the next content pane or the previous content pane, depending on the direction and velocity of the flick gesture. If the velocity of the flick is large enough, the system 800 can transition to the next content pane in that direction. If the velocity isn't strong enough, or if a current content pane is wide, the system 800 can move the content layer in the direction of the flick without actually transitioning to the next content pane. The threshold velocity for a flick to be detected (i.e., to distinguish a flick gesture from a pan gesture) can vary depending on implementation. The threshold velocity for a flick to cause a transition to another content pane also can vary depending on implementation.

The system 800 also can implement edge tap functionality. In an edge tap, a user can tap within a given margin (e.g., 40 pixels) of left or right edges of the display area to cause a transition to an element (e.g., to a next or previous content pane, a next or previous list element, etc.). This can be useful for example, where an element is partially in view in the display area. The user can tap near the element to cause the system to bring that element completely into the display area.

II. Extensions and Alternative Implementations

Various extensions and alternatives to the embodiments described herein are possible.

For example, described examples show different positions of elements (e.g., layers, data collections, etc.) that may be of interest to a user. A user can begin navigation of an element at the beginning of an element, or use different "entry points." For example, a user can begin interacting with a multi-layer UI system in the middle of a content layer, at the end of a content layer, etc. This can be useful, for example, where a user has previously exited from the multi-layer UI system at a position other than the beginning of a layer (e.g., the end of a layer), so that the user can return to the system at the prior location (e.g., before and after a user uses an application invoked by actuating a content image).

III. Example Computing Environment

Figure 9:
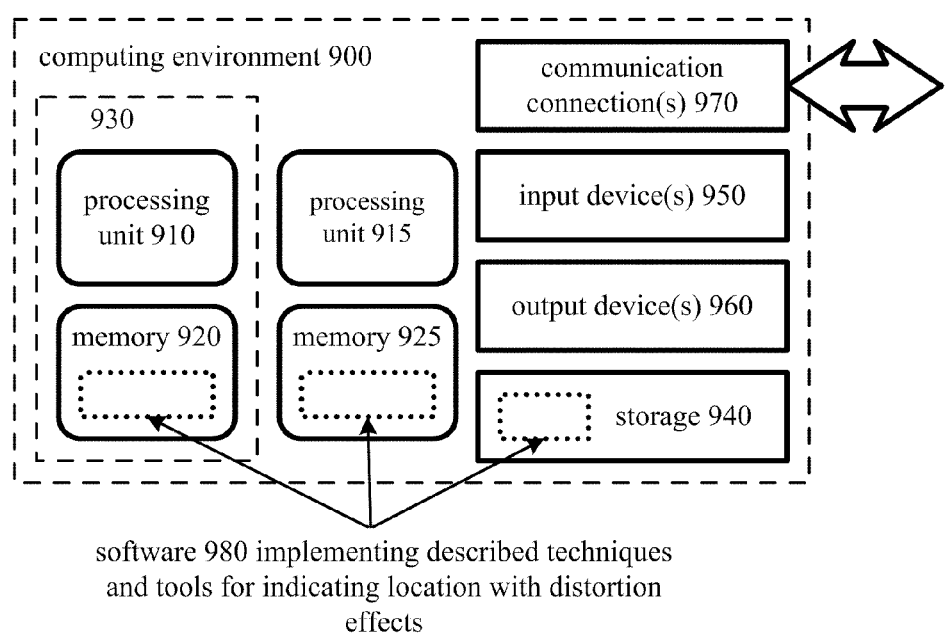
FIG. 9 illustrates a generalized example of a suitable computing environment in which several of the described embodiments may be implemented.

FIG. 9 illustrates a generalized example of a suitable computing environment 900 in which several of the described embodiments may be implemented. The computing environment 900 is not intended to suggest any limitation as to scope of use or functionality, as the techniques and tools described herein may be implemented in diverse general-purpose or special-purpose computing environments.

With reference to FIG. 9, the computing environment 900 includes at least one CPU 910 and associated memory 920. In FIG. 9, this most basic configuration 930 is included within a dashed line. The processing unit 910 executes computer-executable instructions and may be a real or a virtual processor. In a multi-processing system, multiple processing units execute computer-executable instructions to increase processing power. FIG. 9 shows a second processing unit 915 (e.g., a GPU or other co-processing unit) and associated memory 925, which can be used for video acceleration or other processing. The memory 920, 925 may be volatile memory (e.g., registers, cache, RAM), non-volatile memory (e.g., ROM, EEPROM, flash memory, etc.), or some combination of the two. The memory 920, 925 stores software 980 for implementing a system with one or more of the described techniques and tools.

A computing environment may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, DVDs, memory cards, or any other medium which can be used to store information and which can be accessed within the computing environment 900. The storage 940 stores instructions for the software 880 implementing described techniques and tools.

The input device(s) 950 may be a touch input device such as a keyboard, mouse, pen, trackball or touchscreen, an audio input device such as a microphone, a scanning device, a digital camera, or another device that provides input to the computing environment 900. For video, the input device(s) 950 may be a video card, TV tuner card, or similar device that accepts video input in analog or digital form, or a CD-ROM or CD-RW that reads video samples into the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 900, computer-readable media include memory 920, 925, storage 940, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

Figure 10:
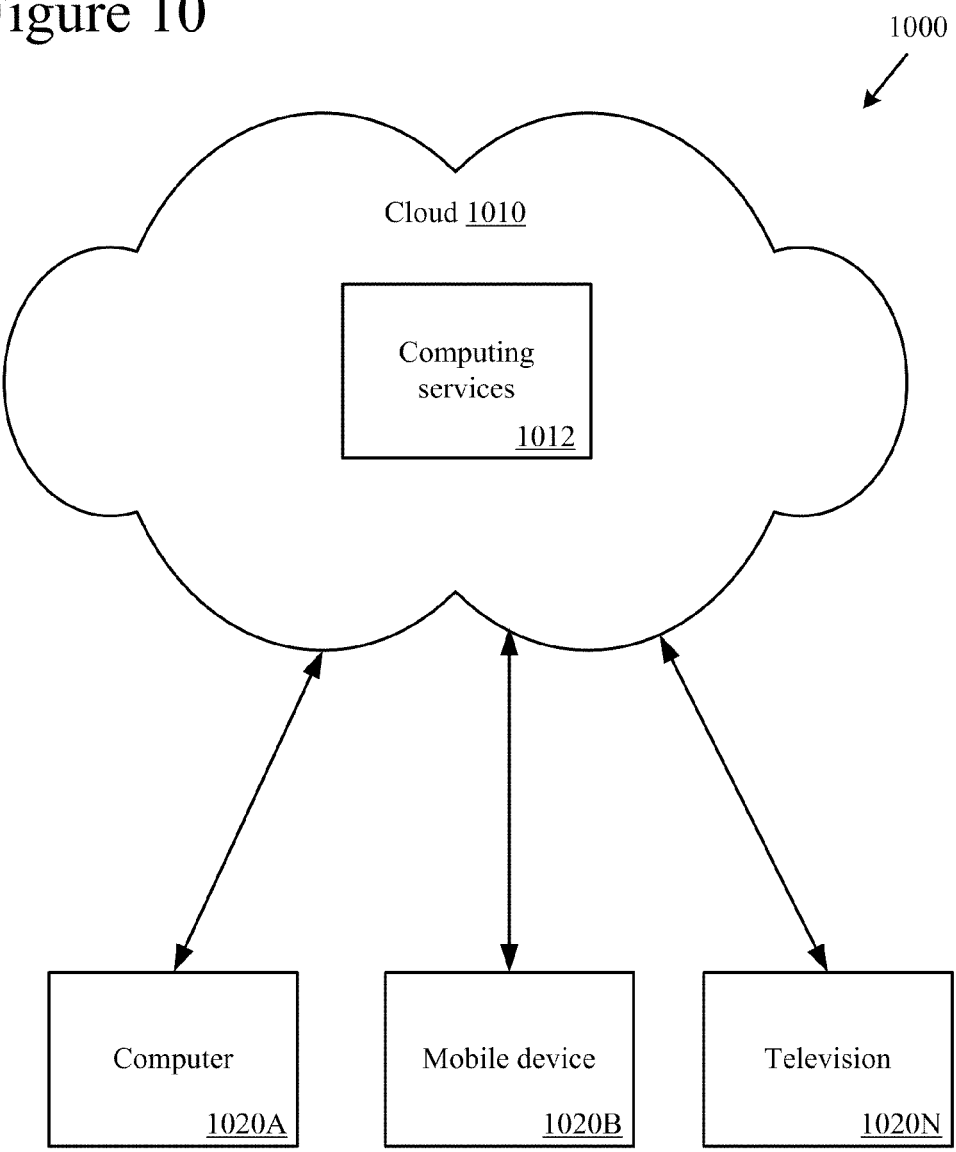
FIG. 10 illustrates a generalized example of a suitable implementation environment in which one or more described embodiments may be implemented.

For the sake of presentation, the detailed description uses terms like "interpret" and "squeeze" to describe computer operations in a computing environment. These terms are high-level abstractions for operations performed by a computer, and should not be confused with acts performed by a human being. The actual computer operations corresponding to these terms vary depending on implementation, IV. Example Implementation Environment FIG. 10 illustrates a generalized example of a suitable implementation environment 1000 in which described embodiments, techniques, and technologies may be implemented.

In example environment 1000, various types of services (e.g., computing services 1012) are provided by a cloud 1010. For example, the cloud 1010 can comprise a collection of computing devices, which may be located centrally or distributed, that provide cloud-based services to various types of users and devices connected via a network such as the Internet. The cloud computing environment 1000 can be used in different ways to accomplish computing tasks. For example, with reference to described techniques and tools, some tasks, such as processing user input and presenting a user interface, can be performed on a local computing device, while other tasks, such as storage of data to be used in subsequent processing, can be performed elsewhere in the cloud.

In example environment 1000, the cloud 1010 provides services for connected devices with a variety of screen capabilities 1020A-N. Connected device 1020A represents a device with a mid-sized screen. For example, connected device 1020A could be a personal computer such as desktop computer, laptop, notebook, netbook, or the like. Connected device 1020B represents a device with a small-sized screen. For example, connected device 1020B could be a mobile phone, smart phone, personal digital assistant, tablet computer, and the like. Connected device 1020N represents a device with a large screen. For example, connected device 1020N could be a television (e.g., a smart television) or another device connected to a television or projector screen (e.g., a set-top box or gaining console).

A variety of services can be provided by the cloud 1010 through one or more service providers (not shown). For example, the cloud 1010 can provide services related to mobile computing to one or more of the various connected devices 1020A-N. Cloud services can be customized to the screen size, display capability, or other functionality of the particular connected device (e.g., connected devices 1020A-N). For example, cloud services can be customized for mobile devices by taking into account the screen size, input devices, and communication bandwidth limitations typically associated with mobile devices.

V. Example Mobile Device

Figure 11:
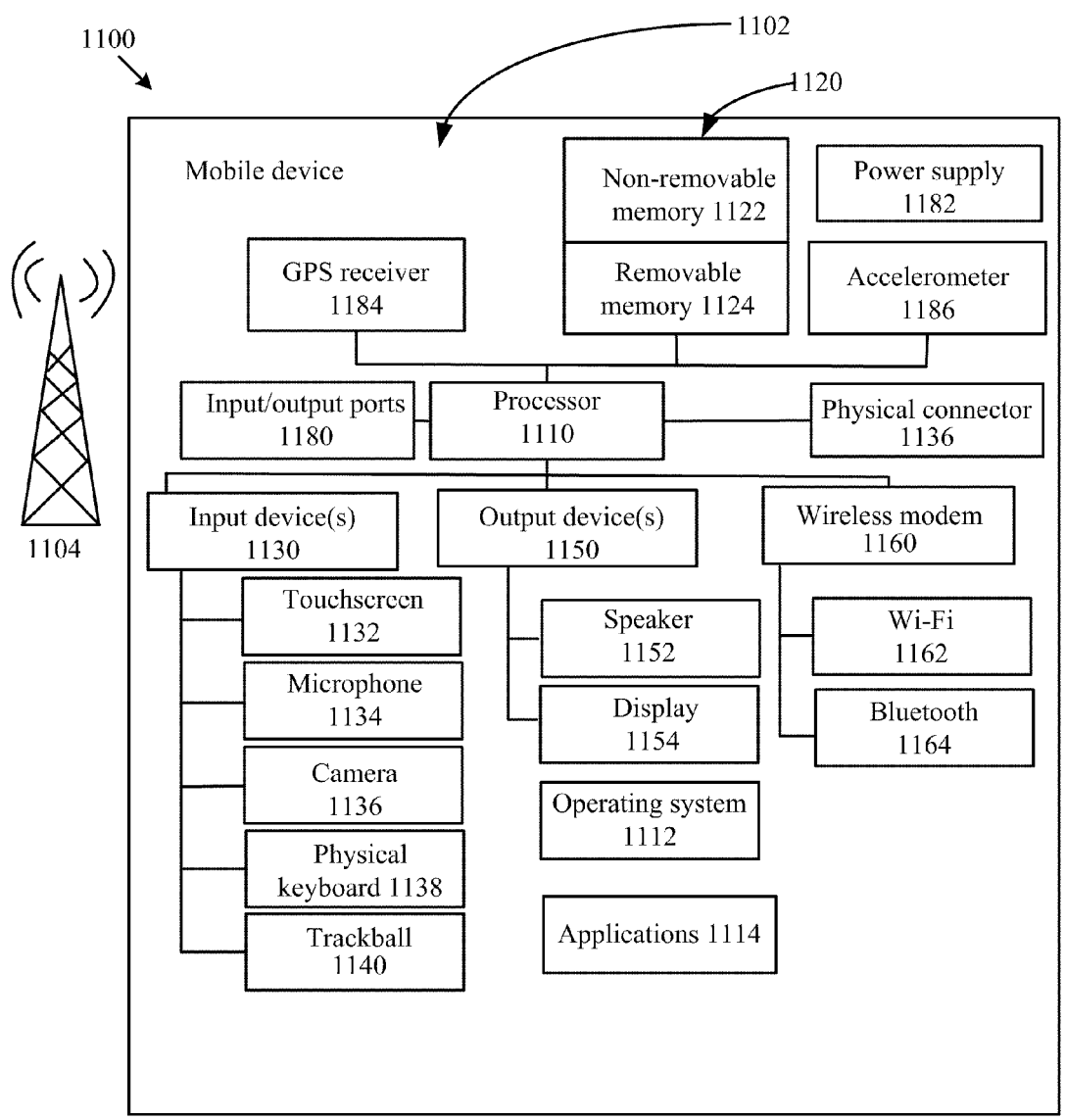
FIG. 11 illustrates a generalized example of a mobile computing device in which one or more described embodiments may be implemented.

FIG. 11 is a system diagram depicting an exemplary mobile device 1100 including a variety of optional hardware and software components, shown generally at 1102. Any components 1102 in the mobile device can communicate with any other component, although not all connections are shown, for ease of illustration. The mobile device can be any of a variety of computing devices e.g., cell phone, smartphone, handheld computer, personal digital assistant (PDA), etc.) and can allow wireless two-way communications with one or more mobile communications networks 1104, such as a cellular or satellite network.

The illustrated mobile device can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components 1102 and support for one or more application programs 1114. The application programs can include common mobile computing applications (e.g., email applications, calendars, contact managers, web browsers, messaging applications), or any other computing application.

The illustrated mobile device can include memory 1120. Memory 1120 can include non-removable memory 1122 and/or removable memory 1124. The non-removable memory 1122 can include RAM, ROM, flash memory, a disk drive, or other well-known memory storage technologies. The removable memory 1124 can include flash memory or a Subscriber Identity Module (SIM) card, which is well known in GSM communication systems, or other well-known memory storage technologies, such as "smart cards." The memory 1120 can be used for storing data and/or code for running the operating system 1112 and the applications 1114. Example data can include web pages, text, images, sound files, video data, or other data sets to be sent to and/or received from one or more network servers or other mobile devices via one or more wired or wireless networks. The memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device can support one or more input devices 1130, such as a touch screen 1132, microphone 1134, camera 1136, physical keyboard 1138 and/or trackball 1140 and one or more output devices 1150, such as a speaker 1152 and a display 1154. Other possible output devices (not shown) can include a piezoelectric or other haptic output device. Some devices can serve more than one input/output function. For example, touchscreen 1132 and display 1154 can be combined in a single input/output device.

A wireless modem 1160 can be coupled to an antenna (not shown) and can support two-way communications between the processor 1110 and external devices, as is well understood in the art. The modem 1160 is shown generically and can include a cellular modem for communicating with the mobile communication network 1104 and/or other radio-based modems (e.g., Bluetooth or Wi-Fi). The wireless modem 1160 is typically configured for communication with one or more cellular networks, such as a GSM network for data and voice communications within a single cellular network, between cellular networks, or between the mobile device and a public switched telephone network (PSSTN).

The mobile device can further include at least one input/output port 1180, a power supply 1182, a satellite navigation system receiver 1184, such as a Global Positioning System (GPS) receiver, an accelerometer 1186, a transceiver 1188 (for wirelessly transmitting analog or digital signals) and/or a physical connector 1190, which can be a USB port, IFEE 1394 (firewall) port, and/or RS-232 port. The illustrated components 1102 are not required or all-inclusive, as components can deleted and other components can be added.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. In a computer system, a computer-executable method comprising:
   providing a user interface comprising a movable data collection, the movable data collection comprising plural elements arranged in a column or a row;
   receiving user input indicating a first movement in the movable data collection;

upon determining that a beginning or an end of the movable data collection has been reached as a result of the first movement, generating a first visual distortion effect, the first visual distortion effect comprising removal of a space between two adjacent elements of the plural elements such that the plural elements are still arranged in the column or the row after removal of the space;

receiving additional user input after the first visual distortion effect has been generated, the additional user input indicating additional movement in a same direction as the first movement;

in response to the additional movement, generating a second visual distortion effect comprising a compression of at least one of the two adjacent elements; and rendering the first movement, the additional movement, the first visual distortion effect, the two adjacent elements, and the second visual distortion effect for display.

2. The method of claim 1, wherein the first and second visual distortion effects indicate that the end of the movable data collection has been reached, and wherein the method further comprises:

in response to the additional movement, displaying at least part of an element at the beginning of the movable data collection to indicate that further movement can cause a wrap to the beginning of the movable data collection.

3. The method of claim 2, wherein the movable data collection is a vertically scrollable list, and wherein the compression comprises a compression in the vertical direction that is greater than a compression in the horizontal direction.

4. The method of claim 2, wherein the movable data collection is a horizontally scrollable list, and wherein the compression comprises a compression in the horizontal direction that is greater than a compression in the vertical direction.

5. The method of claim 1, wherein at least one of the two adjacent elements comprises text, and wherein the compression comprises a squeeze of the text.

6. The method of claim 1, wherein at least one of the two adjacent elements comprises an image, and wherein the compression comprises a squeeze of the image.

7. The method of claim 1 wherein the movable data collection is represented as a single surface, and wherein the second visual distortion effect comprises distorting the surface such that the plural elements are distorted proportionally.

8. The method of claim 1 wherein the computer system is a mobile computing device.

9. At least one hardware computer memory storing computer-executable instructions for visually altering a user interface, the visually altering comprising:

providing the user interface the user interface comprising at least first and second substantially parallel layers to be displayed simultaneously, wherein a first portion of tile first layer is in a viewable display area, and wherein a second portion of the first layer is outside of the viewable display area;

receiving user input indicating a first movement in the first layer; and rendering the first movement in the first layer, wherein the rendering of the first movement comprises:

scrolling at a first movement rate to bring the second portion of the first layer into the viewable display area; and presenting a two-part distortion effect to indicate a beginning or end of elements in the first layer, the elements arranged in a column or a row, the two-part distortion effect comprising removal of a space between two adjacent elements at either the beginning or the end of the elements in the first layer such that the elements are still arranged in the column or the row after removal of the space, followed by compression of the two adjacent elements.

10. At least one hardware computer memory of claim 9, wherein the first movement in the first layer comprises a horizontal movement of the layer, and wherein the compression comprises a horizontal compression of an element in the layer.

11. At least one hardware computer memory of claim 10, wherein the two-part distortion effect is presented to indicate the end of the first layer.

12. At least one hardware computer memory of claim 9, wherein the first portion of the first layer comprises a first portion of a vertically scrollable list in the first layer, and wherein the second portion of the first layer comprises a second portion of the vertically scrollable list.

13. At least one hardware computer memory of claim 12, wherein the first movement in the first layer comprises a vertical movement of the vertically scrollable list, and wherein the compression comprises a vertical compression of an element in the vertically scrollable list.

14. At least one hardware computer memory of claim 9 further comprising:

rendering a second movement in the second layer based at least in part on the user input, wherein the rendering the second movement comprises scrolling at a second movement rate that differs from the first movement rate.

15. At least one hardware computer memory of claim 14, wherein the first movement in the first layer comprises a horizontal movement of the layer, and wherein the second movement rate is based at least in part on the first movement rate.

16. At least one hardware computer memory of claim 9 wherein the computing device is a mobile computing device.

17. A mobile computing device, comprising:

a display;

at least one processor; and at least one computer-readable memory storing modules executable by the at least one processor to control a user interface displayed on the display, the modules comprising:

a motion module operable to receive user interface manipulation events and convert the user interface manipulation events to motion commands; and a layout module operable to receive the motion commands and generate rendering requests operable to present a visual distortion effect that indicates an end in a visual representation of a data collection that is movable by a user, wherein elements in the data collection are arranged as a column or a row, wherein the visual distortion effect comprises both removal of a space between two adjacent elements of the elements in the data collection such that the adjacent elements remain arranged in the column or the row after removal of the space, and compression of the two adjacent elements.

18. The mobile computing device of claim 17, wherein the compression is greater in a first direction than in a second, orthogonal direction.

19. The mobile computing device of claim 17, wherein the compression of the two adjacent elements is performed after the removal of the space between the adjacent elements.

20. The mobile computing device of claim 17, wherein the visual distortion effect is applied to the elements in the data collection that are viewable on the display when the end in the visual representation is reached.

* * * * *